United States Patent [19]

Ponce et al.

[11] Patent Number: 5,313,269
[45] Date of Patent: May 17, 1994

[54] THREE-DIMENSIONAL REFRACTIVELY SCANNING INTERFEROMETER HAVING REMOVABLE OPTICAL CARTRIDGE

[75] Inventors: Fred H. Ponce, Garden Grove; D. Warren Vidrine, San Juan Capistrano; Carlos H. Pareja, Costa Mesa, all of Calif.

[73] Assignee: Research-Cottrell Technologies, Inc., Irvine, Calif.

[21] Appl. No.: 82,427

[22] Filed: Jun. 28, 1993

Related U.S. Application Data

[63] Continuation of Ser. No. 827,987, Jan. 29, 1992, abandoned, which is a continuation-in-part of Ser. No. 663,592, Mar. 1, 1991, abandoned.

[51] Int. Cl.$^5$ .................................................. G01B 9/02
[52] U.S. Cl. ..................................... 356/346; 356/345
[58] Field of Search ........................ 356/345, 346, 244; 250/237 G

[56] References Cited

U.S. PATENT DOCUMENTS

| | | | |
|---|---|---|---|
| 4,165,938 | 8/1979 | Doyle | 356/346 |
| 4,190,366 | 2/1980 | Doyle | 356/346 |
| 4,265,540 | 5/1981 | Doyle | 356/346 |
| 4,286,877 | 9/1981 | Clarke | 356/346 |
| 4,724,329 | 2/1988 | Doyle | 256/504 |
| 4,784,488 | 11/1988 | Doyle et al. | 356/346 |
| 5,155,551 | 10/1992 | Vidrine et al. | 356/345 |

OTHER PUBLICATIONS

Letter from L. Marcus of Laser Precision to J. Baker of Analytical Chemistry, Dec. 17, 1990.
Laser Precision News Release for Diamond-20 ™, Feb. 1, 1991.
Laser Precision color photograph for Diamond-20 ™, 1991.
Analytical Instrument Industry Report, "Analect offers mid-range Windows-based FTIR," vol. 7. No. 20, Feb. 7, 1991.
Chemical Engineering, "Infrared device analyzes multi--component compositions," Feb. 1991.
American Laboratory, "FTIR Instrument," Feb. 1991.
Intech, "FTIR Analyzer," Feb. 1991.
Pharmaceutical Processing, "FT-IR Instrument," Mar. 1991.
Pittsburgh Conference Today, "FTIR," Mar. 5, 1991.
Laboratory Equipment, "Windows 3.0 FTIR Software," vol. 27, No. 10, Feb. 1991.
Spectroscopy International, "FT-IR spectrometers," vol. 3, No. 2, Mar./Apr. 1991.
Press Cutting, "Windows-based compact FTIR," Apr. 1991.
Applied Spectroscopy, "FTIR Spectrometer," and Laser Precision Analytical, vol. 45, No. 3, Mar./Apr. 1991.
Lab Products International, "Process Development," vol. 5-No. 3/4, Mar./Apr. 1991.

(List continued on next page.)

Primary Examiner—Davis L. Willis
Assistant Examiner—LaCharles P. Keesee, II
Attorney, Agent, or Firm—Howrey & Simon

[57] ABSTRACT

A wedge-type interferometer is disclosed that is supported three-dimensionally by a cast inner shell, which contains a readily removable optical cartridge supporting the fixed and movable wedge-shape prisms of the interferometer. The fixed prism is supported from one side of a centerpiece of the cartridge while the movable prism is supported from the other side of the centerpiece for linear, scanning movement. The cartridge may be mechanically and optically aligned prior to insertion into the inner shell, and is easily removed if additional adjustments are required. A first corner cube mirror is supported by a plate secured to one wall of the inner shell and is aligned by micropositioner adjustment in the X-axis. A second corner cube mirror is supported by a plate secured to another wall of the inner shell and is aligned by micropositioner adjustment in the Y-axis. After alignment, the micrometers are removed, and the inner shell may be mounted in an outer, hermetically-sealed casting.

42 Claims, 16 Drawing Sheets

OTHER PUBLICATIONS

American Laboratory, "News Edition/Apr. 1991," Apr. 1991.

Orange County Register, "OC/Nation," May 1, 1991.

Lab Products International, "FTIR System," vol. 5-No. 1/2, Jan./Feb. 1991.

Lab Products International Telefax Message to Howrey & Simon, Feb. 18, 1992.

Chemistry in Britain, "Laser Precision Analytical" and letter, undated.

R&D, "New FTIR Features Windows Capability," undated.

Piquality, "FTIR Spectrometer With Windows," First Quarter 1991.

Laser Precision Product Brochure for Diamond-20 TM, 1991.

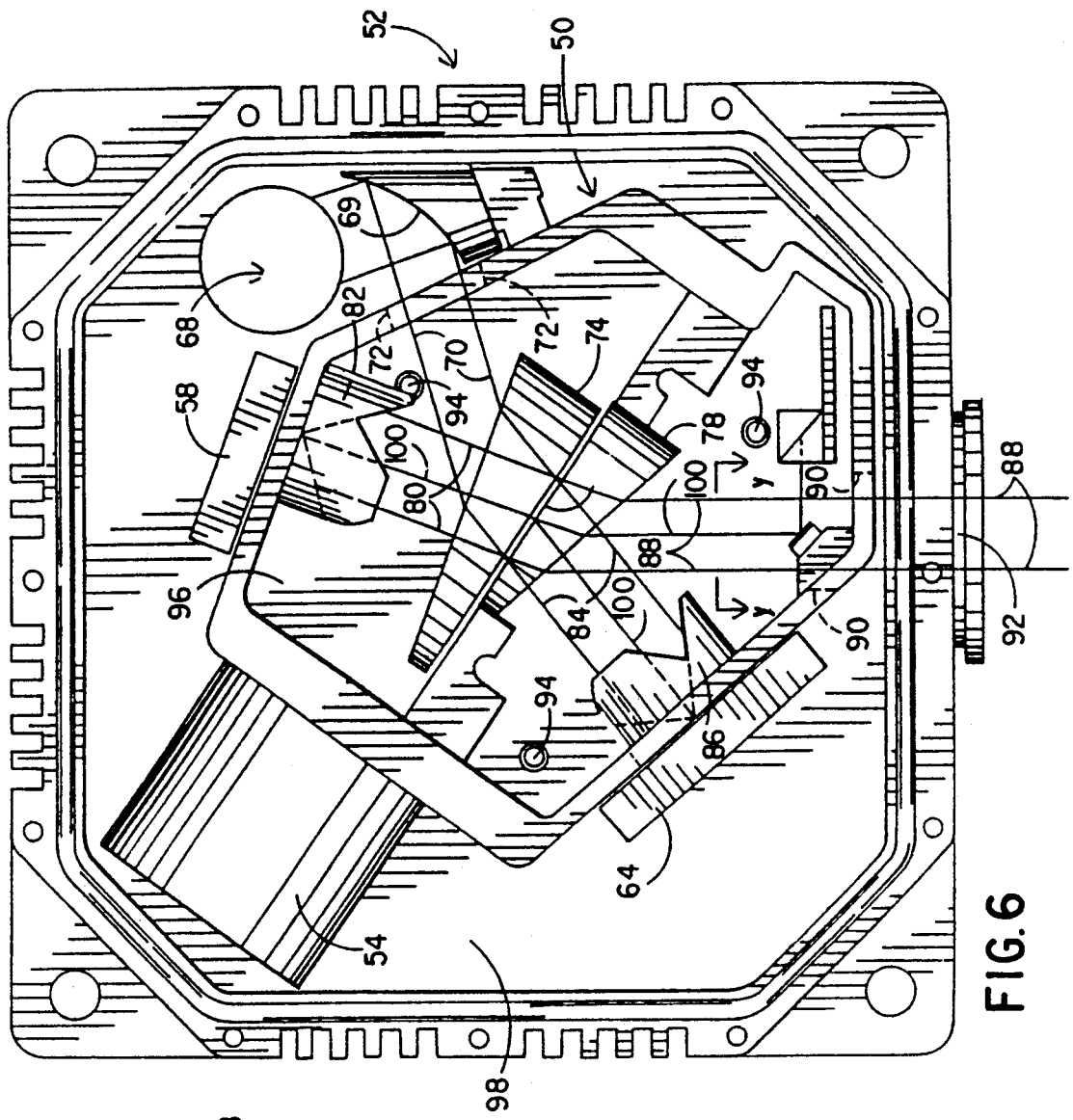
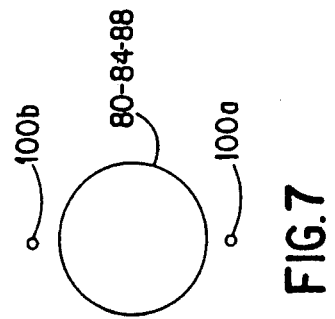
FIG.6
FIG.7

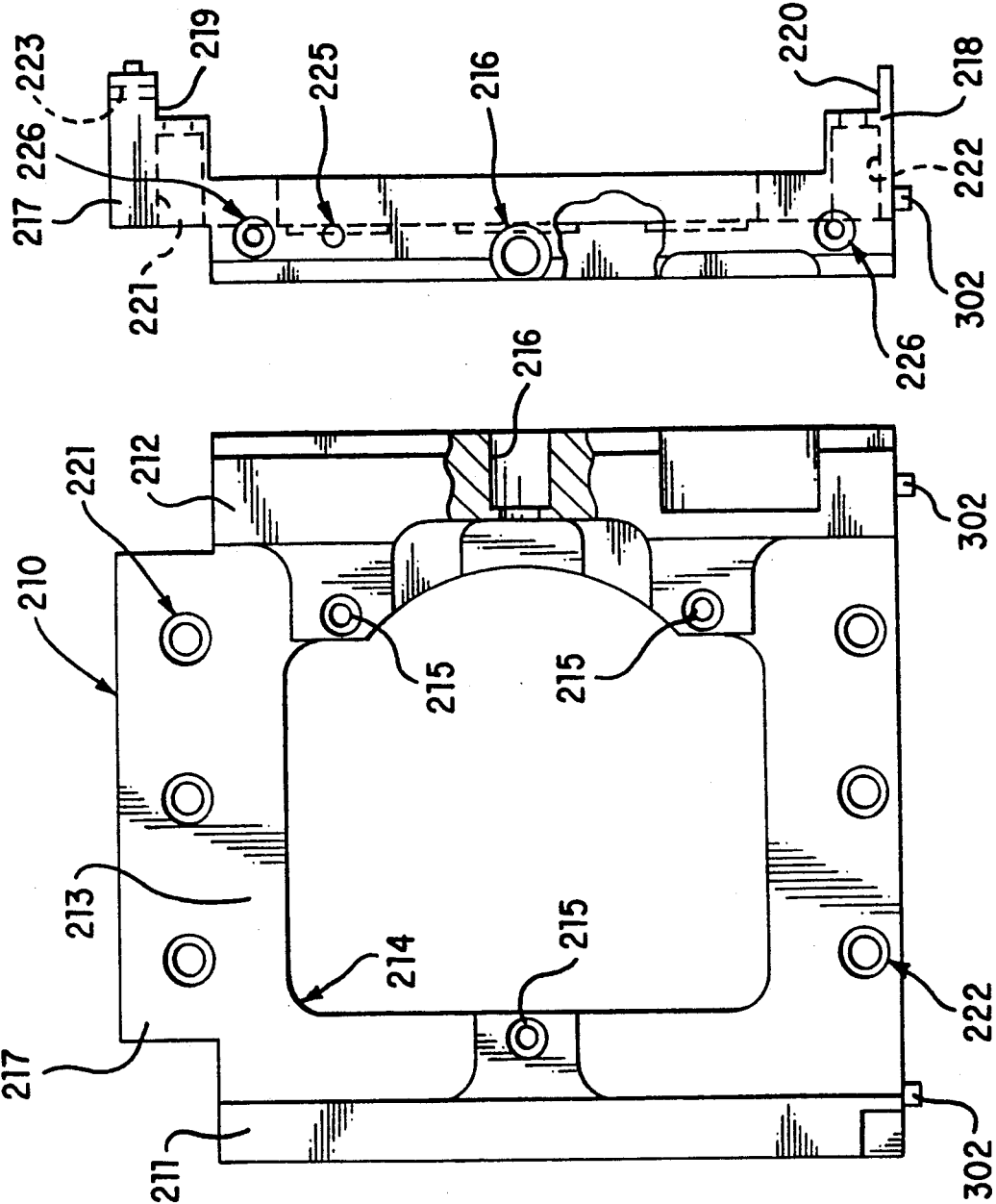
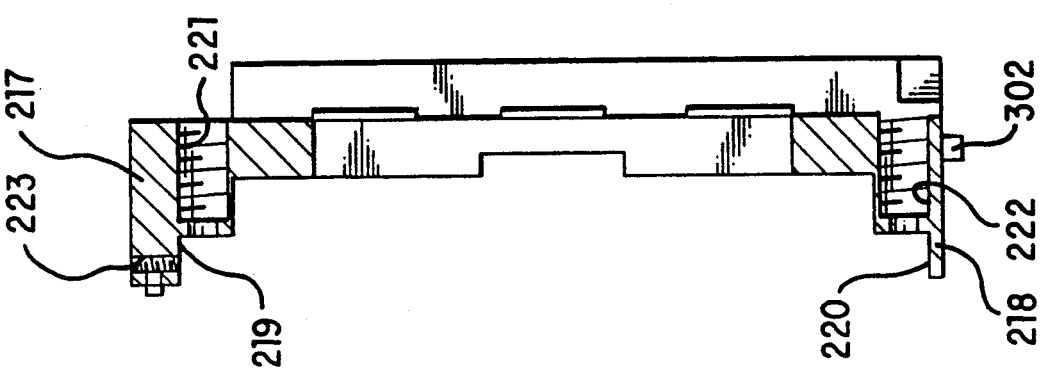

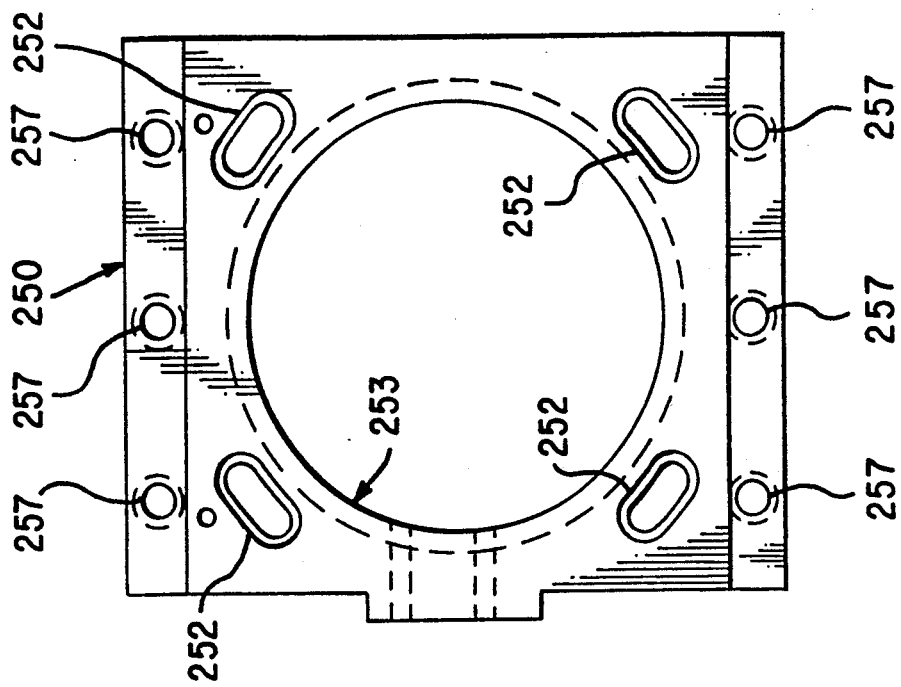
FIG. 25
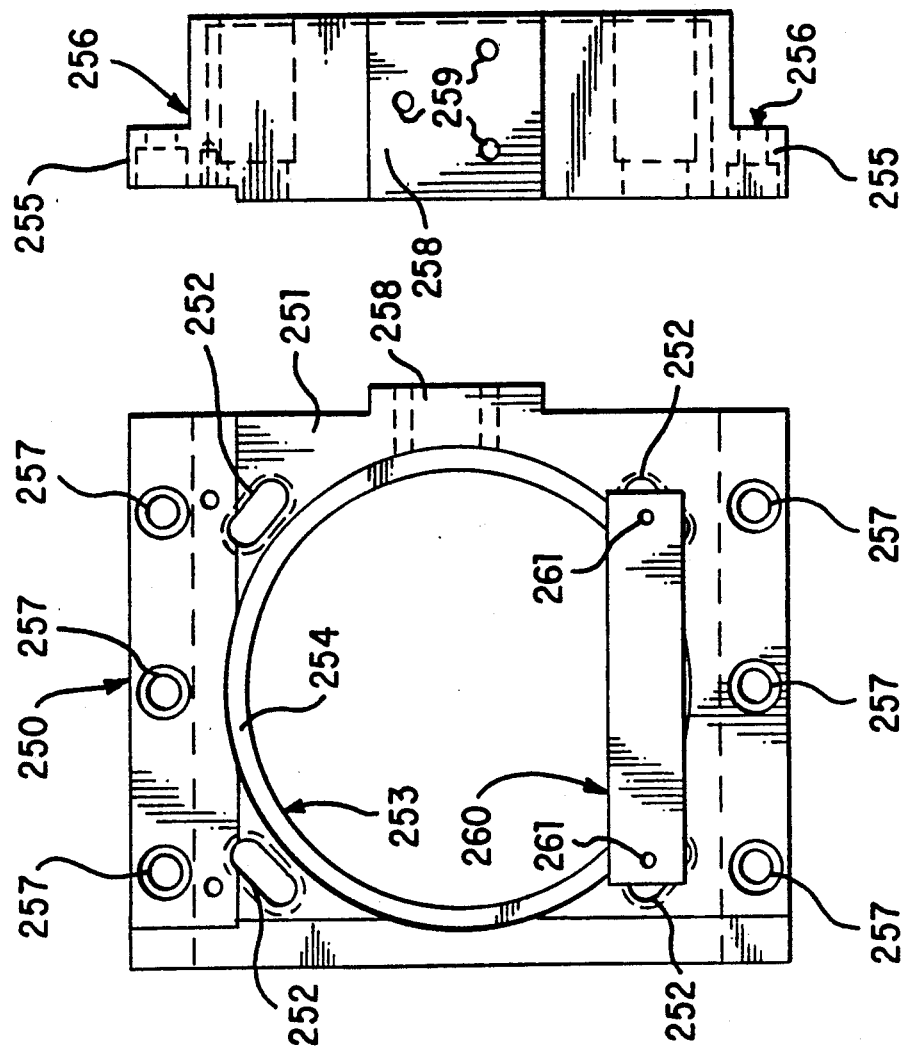
FIG. 24
FIG. 23

THREE-DIMENSIONAL REFRACTIVELY SCANNING INTERFEROMETER HAVING REMOVABLE OPTICAL CARTRIDGE

BACKGROUND OF THE INVENTION

This application is a continuation of application Ser. No. 07/827,987, filed on Jan. 29, 1992, now abandoned, which is a continuation-in-part of copending application Ser. No. 07/663,592, now abandoned, of Fred H. Ponce and D. Warren Vidrine, entitled Three-Dimensional Refractively Scanning Interferometer Structure, filed Mar. 1, 1991, and assigned to the assignee of the present application.

Refractively scanning interferometers, i.e., interferometers in which scanning is accomplished by moving a wedge-shaped prism, have proved to be very useful spectrometer components, particularly for use in environments requiring rugged equipment. Such environments are often encountered in non-laboratory situations, such as process control, environmental monitoring, and the like.

A wedge-type interferometer preferably has two fixed mirrors of the retroreflector type, and a wedge-shaped prism which moves across one of the two interferometer arms. The assignee of the present application has four U.S. patents relating to "refractively scanned" interferometers, listed in the order of their application filing dates: U.S. Pat. Nos. 4,190,366; 4,165,938; 4,265,540 and 4,286,877.

The present application discloses wedge-type interferometers which retain the benefits inherent in such interferometers, while significantly simplifying and improving their structure and functional features.

Advantages of the wedge-type interferometers are of major importance. None of the three critical optical components in the interferometer is moved during operation, i.e., the two mirrors at the ends of the interferometer arms, and the beamsplitter. The structure is able to function under harsh conditions because its critical optical components are stationary. Since a wedge-type interferometer incorporates retroreflectors (usually corner cubes), instead of flat mirrors, certain beamsplitter aberrations are compensated for, making the beamsplitter less difficult to fabricate and less costly.

In interferometers using a moving mirror, certain alignments are critical. A flat mirror must not tilt in either axis, but it may be allowed to translocate. Conversely, a corner cube may be allowed to tilt around its apex, but it must not translocate. The absence of a moving mirror in a wedge-type interferometer permits alignment to be more conveniently and accurately attained and maintained.

The apparatus of this application retains the important advantages of the wedge-type interferometer, while it significantly reduces the size and number of parts, and improves the performance, of such interferometers. It meets all performance requirements relative to thermal, stress, vibration, and acoustical criteria.

SUMMARY OF THE INVENTION

The invention provides unitized internal and external housing assemblies. The interferometer is so arranged as to provide a three-dimensional supporting structure, instead of a mounting plate which supports interferometer elements from the bottom only.

The structure allows the overall X-Y-Z optical coordinates to achieve optimum positioning results for repeatability and reliability. Pre-alignment is obtained using micropositioning assemblies, which may be designed as part of the support structure itself or as temporary fixtures that are then removed and reused in pre-aligning other interferometers. Further adjustment is not necessary because of the stable support of the optical elements.

The external housing assembly may be hermetically sealed, which has obvious advantages in certain environments. The unsealed pre-aligned internal housing assembly is mounted inside the external housing assembly. The heat-producing elements are arranged to use the external housing assembly as a heat sink, in order to avoid overheating the interferometer elements.

The sole moving element of the interferometer, the wedge-shaped prism adjacent the beamsplitter, is supported for scanning motion by upper and lower tracks, thus providing a center-of-mass linear bearing system which eliminates rotational movement and reduces bearing wear.

Furthermore, a modification that retains the center-of-mass linear bearing system is disclosed in which the fixed beamsplitter prism and the movable, scanning prism are supported in a cartridge detachably secured within the internal housing. The optical cartridge significantly simplifies the assembly process by permitting mechanical and optical alignment before insertion into the inner housing. This obviates the need for tedious installation and pre-loading of the bearing assembly inside the confined space of the inner shell, which requires a specially designed alignment jig that has to accommodate, and detrimentally exposes, the sensitive wedges already in place to handling and contamination. The cartridge also allows for alignment of the beamsplitter and scanning prisms independent of the mounting surfaces inside the inner shell and, thus, without risking serious damage to the wedges by attempting to align them in a space where conventional tools or holders cannot be used. Aligning the wedges to establishing parallelism of the wedge faces is an essential requirement of an interferometer because it ensures that the light path through the wedges does not angularly deviate from the vertical and horizontal planes, within the accuracy required for the analytical beam.

According to another aspect of the invention, a method of assembly is disclosed that takes advantage of the cartridge effect. More specifically, after the wedges are assembled in their respective carriers and pre-aligned with a known optical imager to produce a straight beam path, the scanning wedge is connected to one side of a centerpiece and the bearing pre-loads are adjusted. After the scanning wedge is optically aligned, through appropriate rotation in its carrier, the beamsplitter wedge is fixedly connected to other side of the centerpiece and similarly optically aligned, thus producing a unitary beamsplitter/compensator unit that has been mechanically and optically aligned, and is ready to be installed, essentially as a drop-in-cartridge, into the inner shell. The inner shell is designed to slidably receive the cartridge, which may contain dowel pins at the lower surface thereof to mate with corresponding holes in the bottom of the inner shell and, thereby, precisely locate the bottom of the cartridge. The sides of the cartridge then are located by alignment pins that are removed after the bottom and side fasteners are in place.

The cartridge effect increases the reliability of the mechanical and optical performance of the interferometer because prior to assembly into the inner shell the system can be optically and mechanically aligned, as well as temperature tested if desired. Even if a problem is discovered after installation to the inner shell, the cartridge may be readily removed and then adjusted or replaced with a previously qualified cartridge. The cartridge design also enables a relatively skilled field technician to replace the optics in the field, rather than shipping the unit back to the factory as commonly is the case. Thus, the cartridge also could be used as a way to easily switch optical ranges in an interferometer. The removable cartridge of the invention is not limited to the specific interferometer structure disclosed herein, but may be beneficial in other interferometers as well.

BRIEF DESCRIPTION OF THE DRAWINGS

FIG. 6 is a plan view of the entire assembled structure, with the top removed;

FIG. 7 illustrates the relative positions of the IR beam path and the two laser beam paths in FIG. 6;

FIG. 17 is an elevational view of the unitary centerpiece of the removable cartridge illustrating the side that supports the fixed wedge.

FIGS. 18-19 are front and sectional views, respectively, of the centerpiece shown in FIG. 17.

FIG. 23 is an elevational view of the outer side (not visible in FIG. 16) of a movable wedge carrier that can be supported by the removable optical cartridge.

FIG. 24 is an elevational view of the end of the movable wedge carrier to which the motor is attached.

FIG. 25 is an elevational view of the inner side of the movable wedge carrier shown in FIG. 23.

DETAILED DESCRIPTION

Figure 1:
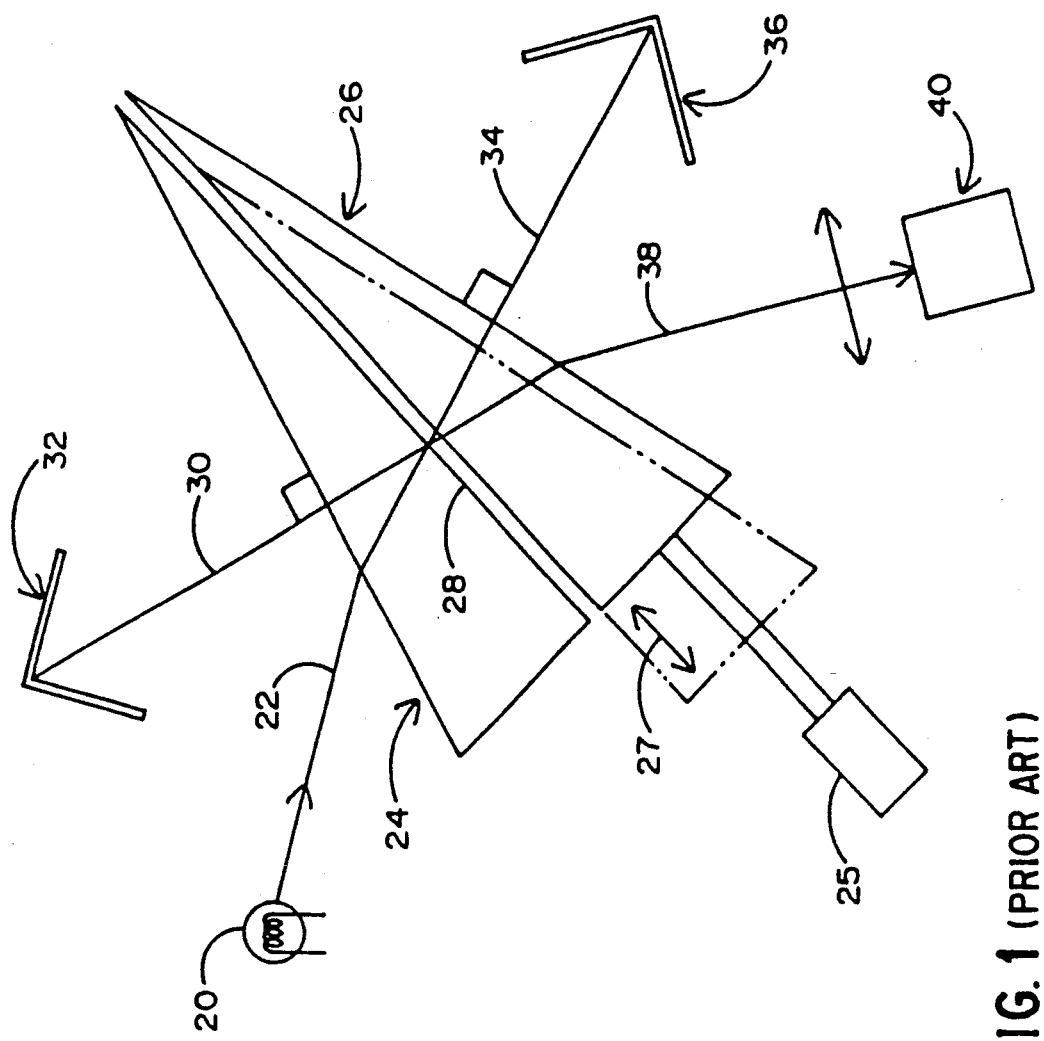
FIG. 1 is substantially identical to FIG. 1 of common assignee U.S. Pat. No. 4,265,540.

FIG. 1 (similar to FIG. 1 in U.S. Pat. No. 4,265,540) shows schematically a wedge-type interferometer of the prior art. An analytical radiation beam, e.g., infrared (IR), from a source 20 follows path 22 to a wedge-shaped prism 24. Another wedge-shaped prism 26 is so dimensioned that the refractive effects of prisms 24 and 26 are equalized in the zero path difference (ZPD) position.

One of the wedges 24 is non-movable and carries beamsplitter coating material on its surface 28. The other wedge (26) is movable for scanning purposes by a motor 25 back and forth in the direction indicated by the arrows 27. In the ZPD position of the movable wedge, the path lengths of the radiation through the two wedges are equal. The position of one wedge is initially adjusted to the ZPD position.

The IR radiation beam 22 is partially (half) reflected and partially (half) transmitted by beamsplitter 28. The beamsplitter-reflected radiation travels along a path 30 toward a fixed retroreflecting mirror 32, (e.g., a corner cube). The beamsplitter-transmitted radiation travels along a path 34 toward another fixed retroreflecting mirror 36 (e.g., a corner cube). The radiation path is indicated by a single line in FIG. 1. Generally, the analytical (IR) radiation beam is a one-inch diameter collimated beam.

Returning radiation from the corner cube mirrors 32 and 36 is recombined at the beamsplitter 28. The reflected half of the recombined radiation follows a path 38 toward a detector 40. In spectrometer use, a sample is interposed in the path 38, so that its characteristics are recorded by a detector-produced spectrogram.

The fixed wedge-shaped prism 24 may be shorter than the movable wedge-shaped prism 26. A shorter wedge is inherently easier to manufacture and less subject to radiation distortion problems. The wedges, particularly the moving wedge 26, are the most expensive optical parts of the interferometer. The blanks from which the wedges are fabricated are usually thick circular plates which initially have flat surfaces on both sides. The wedge is formed by removing material from one side of the plate. A smaller wedge is formed from a smaller diameter plate, and it therefore is inherently easier and less expensive to manufacture than a larger wedge.

The moving wedge 26 must be longer than the fixed wedge 24 for two reasons:

(1) Its length must allow for the scanning travel, the length of which is added to the diameter of the infrared radiation beam; and (2) Its length (in the prior art structure) must allow for a referencing (clocking) laser beam, which passes through each wedge on its entering and returning paths, one of which paths is near the thin end of the wedge, and the other of which is near the thick end of the wedge.

Exemplary dimensions involved might be a one-inch diameter IR beam, a wedge travel distance slightly under one inch, and a space of one-fourth inch between each laser beam path and the adjacent edge of the IR beam. The laser beam paths must be outside the IR beam path.

Figure 2:
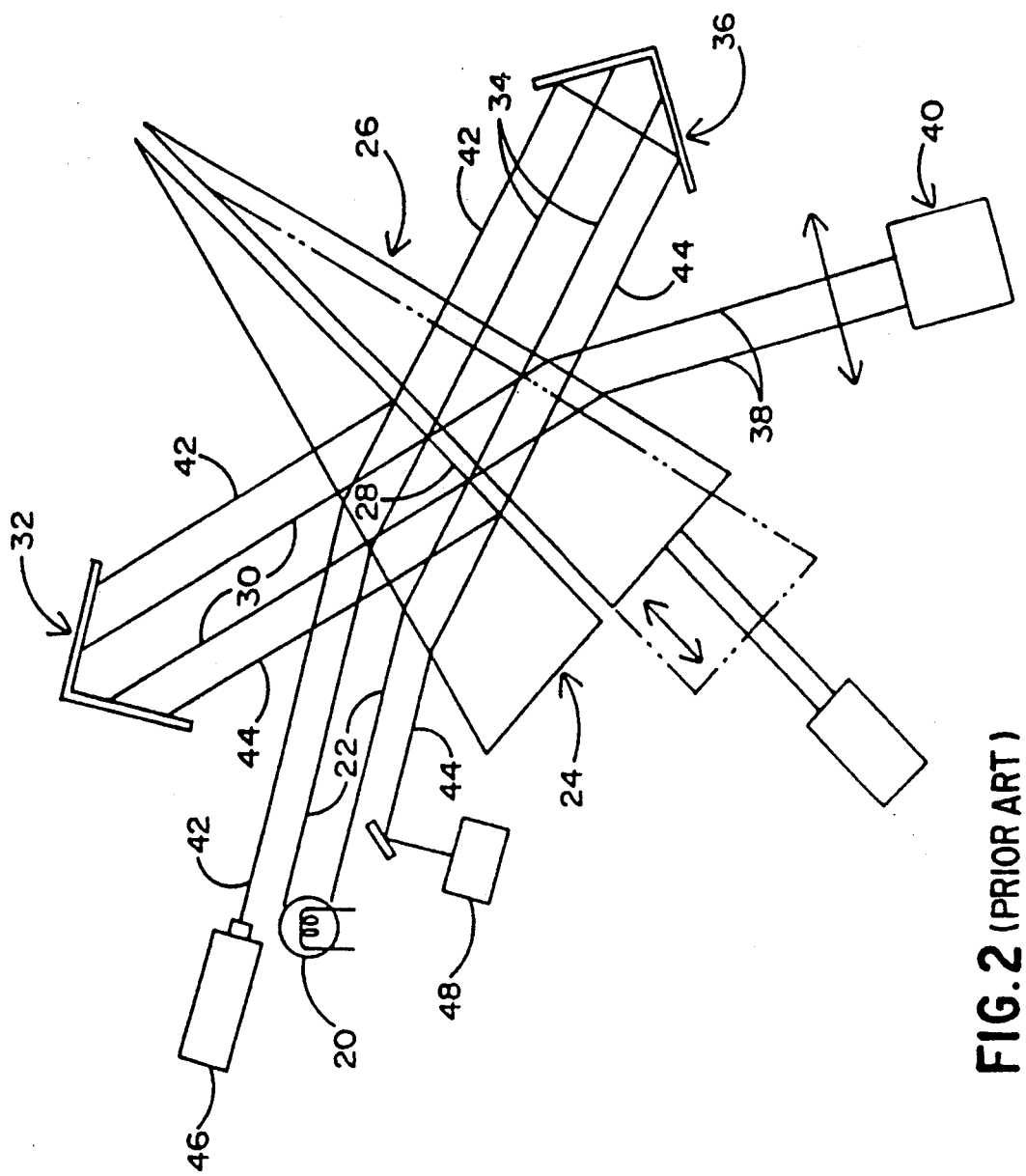
FIG. 2 is the same as FIG. 1, except that it includes the entering and returning paths of the laser clocking beam in a prior art system.

In FIG. 2, the referencing laser beam system of the prior art is shown schematically following a path 42 entering the interferometer, and a return path 44 leaving the interferometer. The laser beam has its own source 46 and detector 48. The primary purpose of the laser (monochromatic) beam is to use pulses from a periodic fringe pattern to "clock" the sampling of IR detector signals by the FTIR system. It also is useful in the process of alignment of the interferometer prior to interferometer operation. In FIG. 2, the spacing of each laser beam path 42 and 44 from the IR beam is exaggerated for easier illustration.

The apparatus of the invention retains the basic prior art structure, including the movable wedge, the beamsplitter coated non-movable wedge, and the two fixed corner cube mirrors. However, its overall supporting structure is significantly different from that of the earlier wedge-type interferometers.

The supporting structure for the interferometer is an important aspect of this application. It is so constructed as to: (1) be compact, (2) be very stable and rugged, (3) provide three-dimensional support for the optical elements, (4) permit hermetic sealing, (5) require a minimum number of parts, and (6) permit reliable permanent pre-alignment.

Figure 3:
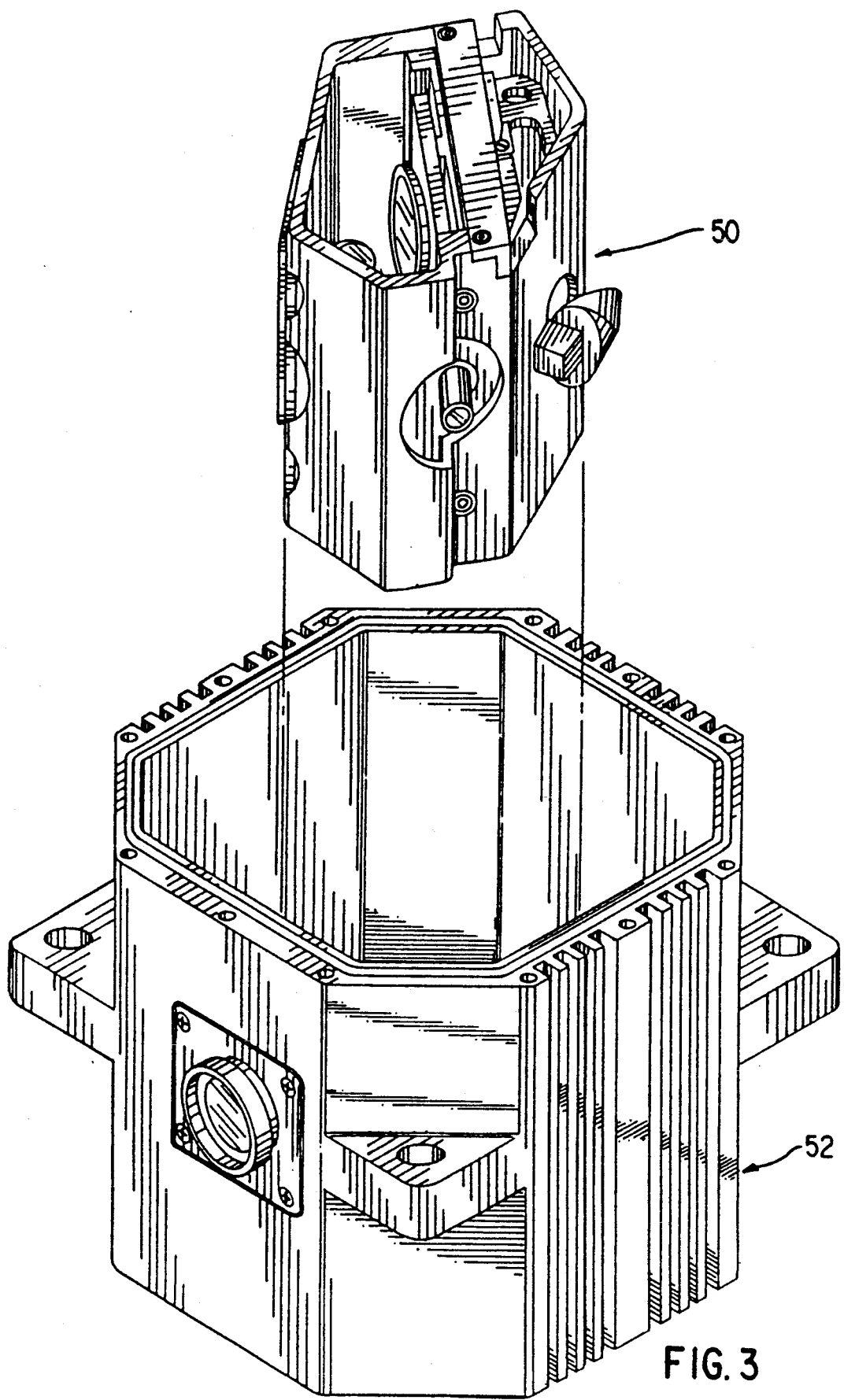
FIG. 3 is an isometric drawing showing the inner and outer castings which constitute the main structural subassemblies of the invention.

In order to accomplish these goals, two primary shells are used, as shown in FIG. 3. An inner shall 50 provides support for all of the optical elements. An outer shell 52 encloses the inner shell, plus certain heat-producing elements. The outer shell 52 can be hermetically sealed; and it is arranged to function as a heat sink for the heat-producing elements, thus permitting the enclosed interferometer to operate in a relatively cool environment.

The inner and outer shells 50 and 52 are preferably formed as castings. They provide structural rigidity and precision of location for the elements they support. This location precision is particularly important for the inner shell 50, because it permanently positions the optical elements of the interferometer, after their initial alignment.

Figure 4:
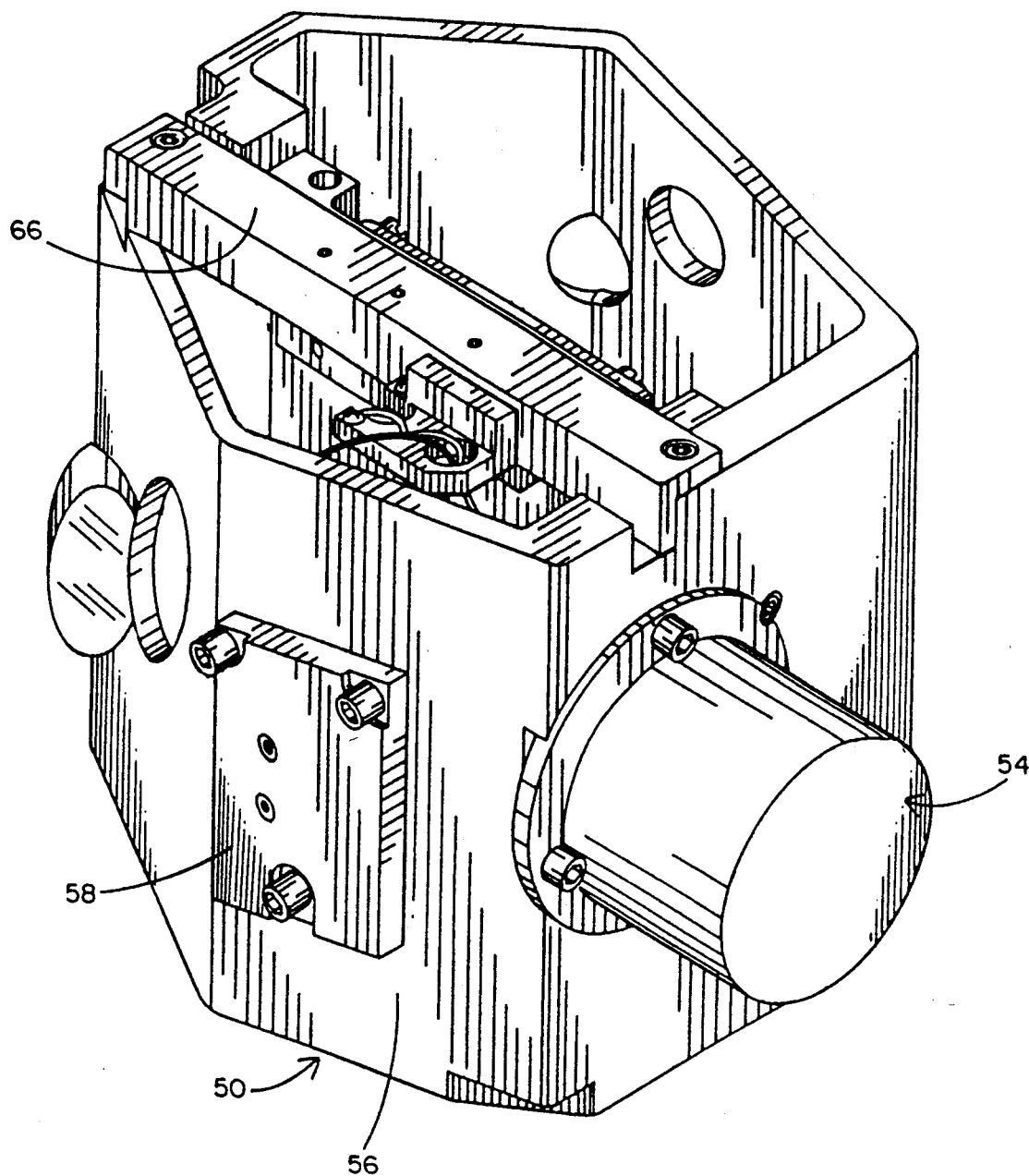
FIGS. 4 and 5 are isometric drawings showing from different vantage points the inner shell (casting) of the structure, which includes the optical elements of the interferometer.
Figure 5:
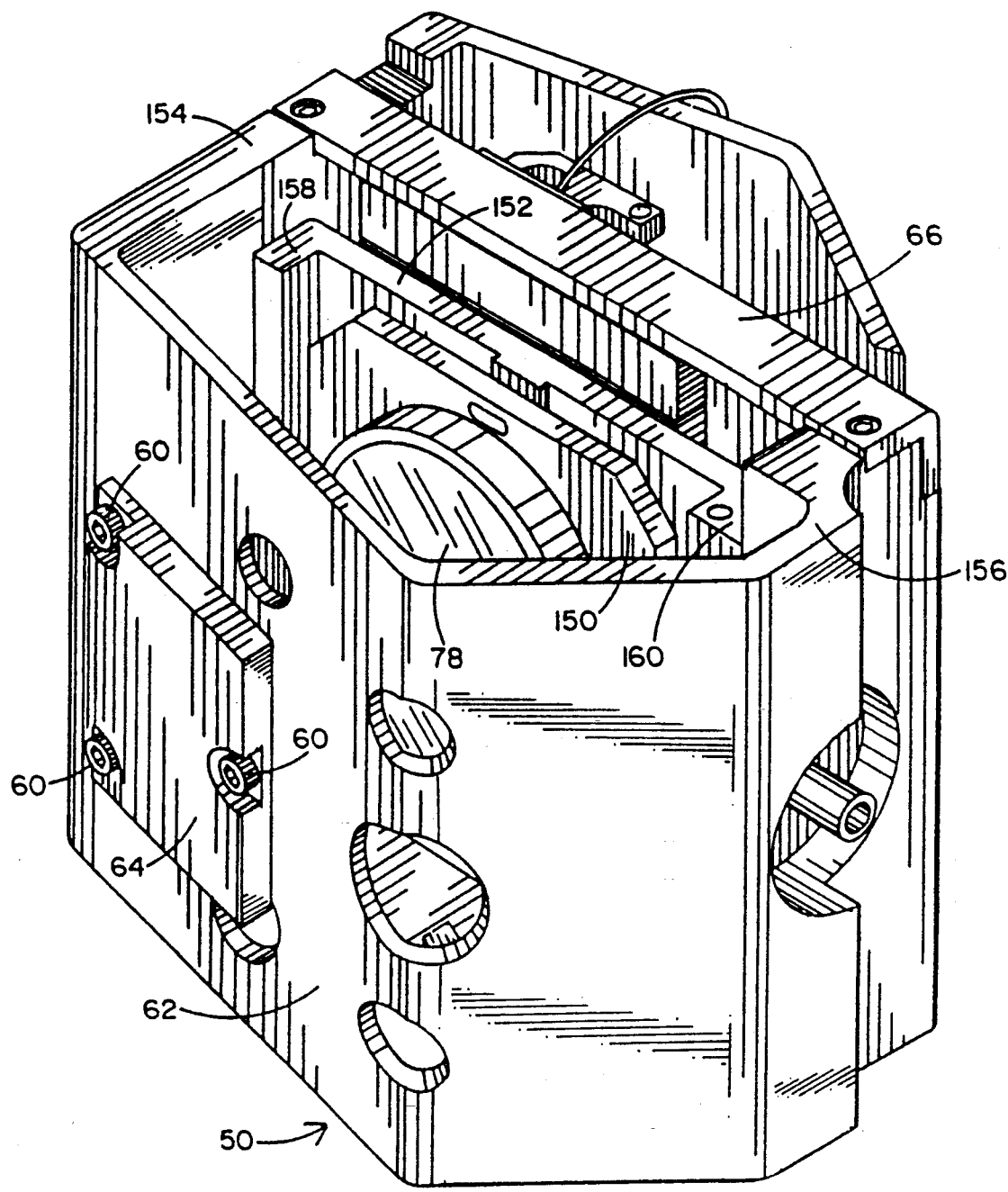

FIGS. 4 and 5 are isometric views of the inner shell 50. A motor 54 (FIG. 4) is used to drive the movable wedge. One wall 56 of shell 50 carries a plate 58 which supports one of the corner cubes mounted inside shell 50. Alignment of the interferometer in the Y-axis is accomplished by precise vertical adjustment of plate 58, which moves the attached corner cube. A micropositioner has been used for Y-axis alignment. The micropositioner may be formed integral with the support plate or as separate mechanisms, which were removed from shell 50, before insertion of the shell into shell 52. Plate 58, after Y-axis adjustment, is held firmly against wall 56 of shell 50 by a plurality of fastening members 60, the heads of which are seen in the figure. The process of initial adjustment (alignment) of plate 58 is described in detail below.

FIG. 5 shows another wall 62 of shell 50, which carries a plate 64 supporting the other corner cube mounted inside shell. Alignment of the interferometer in the X-axis is accomplished by precise horizontal adjustment of plate 64, which moves the attached corner cube. A micropositioner has have been used for X-axis adjustment. The micropositioner may be formed integral with the support plate or as separate mechanisms, which were removed from shell 50, before insertion of the shell 50 into shell 52. Plate 64, after X-axis adjustment, is held firmly against wall 62 of shell 50 by a plurality of fastening members 60, the heads of which are seen in the figure. The process of initial adjustment (alignment) of plate 64 is described below.

Both FIGS. 4 and 5 show an upper track 66 which extends across the major dimension of the top of shell 50 and is connected thereto. This track performs an important function as the upper part of a two track structure for guiding the path of the movable wedge. The wedge guide provides both upper and lower tracks for maximum stability as the wedge performs its scanning m motion.

FIG. 6 is a plan view of the entire two-casting structure, showing the positions of the optical elements in the assembled sealable unit. An IR source 68 and a parabolic mirror 69 direct a collimated beam 70 through a movable wedge-shaped prism 74 to a beamsplitter surface 76 formed on the inner side of a fixed wedge-shaped prism 78.

The beamsplitter-reflected portion of IR beam 70 travels along a path 80 to a first corner cube reflector 82, which reflects it back to the beamsplitter 76. The beamsplitter-transmitted portion of the IR beam 70 passes through the fixed wedge-shaped prism 78, along a path 84 to a second corner cube reflector 86. Corner cube 86 reflects the IR beam back to the beamsplitter 76, where the two beams are recombined.

IR path 80 constitutes one "arm" of the interferometer, and IR path 84 constitutes the other "arm" of the interferometer. Movement of the wedge 74 across path 80, under the control of motor 54 (FIG. 4), varies the length of radiation path 80, thus providing the desired spectral scanning information. The recombined IR beam follows a path 88 through an opening 90 in inner shell 50, and a window 92 in outer shell 52, toward a sample and detector (not shown).

As shown, corner cube 82 is secured to plate 58 (FIG. 4); and corner cube 86 is secured to plate 64 (FIG. 5). Inner shell 50 is firmly secured to other shell 52 by means of a plurality of screws 94 which extend through floor 96 of inner shell 50 and into floor 98 of outer shell 52. Floor 98 is a thick metal member, which functions as an effective heat sink member. The IR source 68 is secured directly to floor 98 of outer shell 52.

Line 100 is FIG. 6 represents the path of a laser clocking beam. The laser system and its novel functions are described in detail in copending, application Ser. No. 07/663,374 of D. Warren Vidrine and Fred H. Ponce, entitled "Laser Referencing System for Refractively Scanning Interferometer", filed Mar. 1, 1991 and assigned to the assignee of the present application. In the FIG. 6 plan view, a single line 100 represents both the laser beam path below the IR beam and the laser beam path above the IR beam. In FIG. 7, a laser beam path 100a is shown below the IR beam 80-84-88, and a laser beam path 100b is shown above the IR beam 80-84-88.

Figure 9:
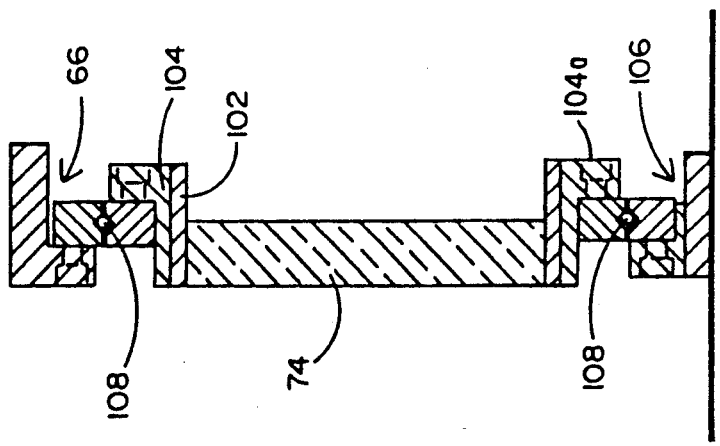
FIG. 9 is a section taken on the line 9—9 of FIG. 8.
Figure 8:
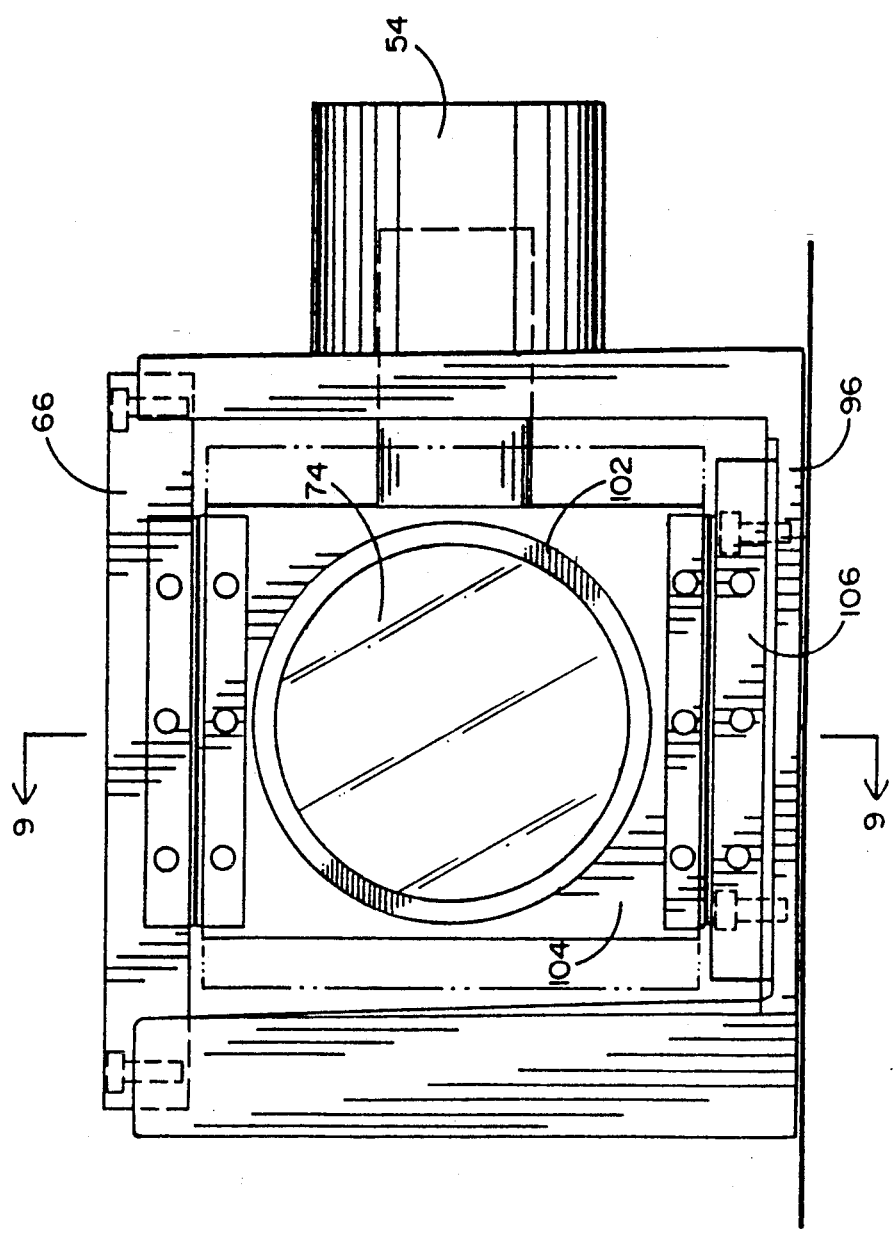
FIG. 8 is a side elevation showing the moving wedge and the tracks along which it travels.

FIGS. 8 and 9 show the mechanism for supporting and guiding the movable wedge 74. The fixed wedge is omitted from these figures, for clearer understanding. As seen in FIG. 8, wedge 74 has a circular outline. A longitudinal horizontal view would show the wedge shape of FIG. 6. Wedge 74 is supported in an annular member 102, which in turn is carried by a plate 104. As shown in the vertical cross-section (FIG. 9), the wedge-supporting structure is guided by a lower track 106 and an upper track 66 (FIGS. 4 and 5). Lower track 106 is secured to the floor 96 of inner shell 50, while upper track 66 is attached to top of shell 50 (FIG. 5). Linear roller bearings 108 are provided between the moving wedge-carrying structure and each of the lower and upper stationary tracks 106 and 66. The reciprocating movements of the wedge-carrying structure are controlled by motor 54 (FIG. 4).

This combination of lower and upper tracks for guiding the movement of wedge 74 is referred to as a center-of-mass bearing system. It is particularly important because of the relatively heavy wedge structure, which may incur wobbling problems if supported solely on tracks at the bottom. The lower/upper tracks eliminate rotational moments at turnaround (direction reversal), and meet much higher anti-tilt requirements in the vertical axis. The lower/upper bearing arrangement becomes possible only with a three-dimensional interferometer supporting structure.

The stability of the moving-wedge is vital, because the moving wedge is a heavier optical element than the movable optical elements in non-wedge interferometers. As discussed above, the moving wedge must be long enough to accommodate the diameter of the IR beam, plus the length of the scanning motion. The use of lower and upper guiding tracks provides wide track separation, which substantially prevents side-to-side motion. Furthermore, since the two tracks are displaced equal distances from the center of force exerted by the motor, there is equal static friction above and below, and equal dynamic friction above and below. Thus, the motor is exerting force on a balanced load.

Figure 10:
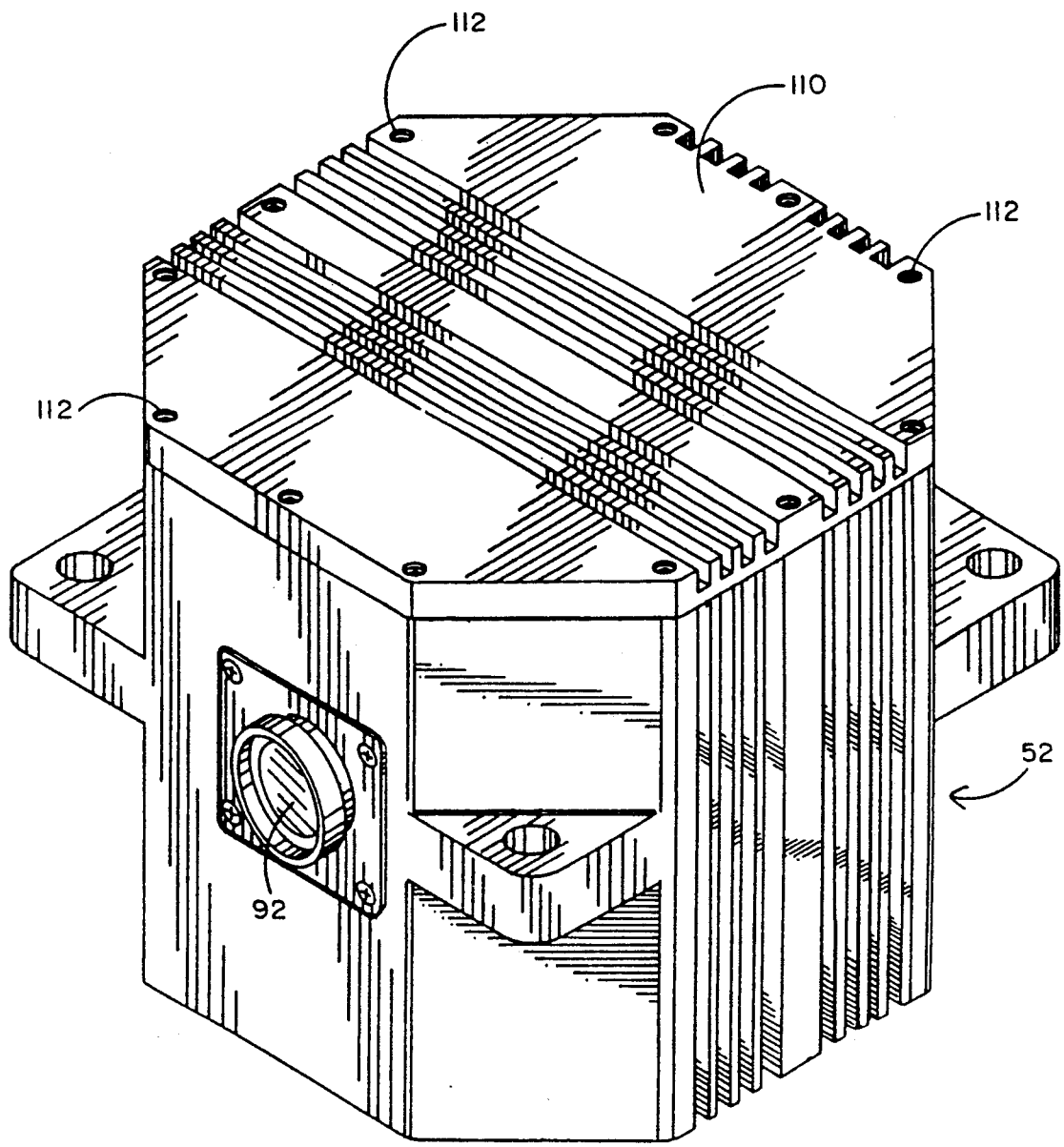
FIGS. 10-12 are isometric drawings showing the final assembly of the inner shell and outer shell combination.
Figure 11:
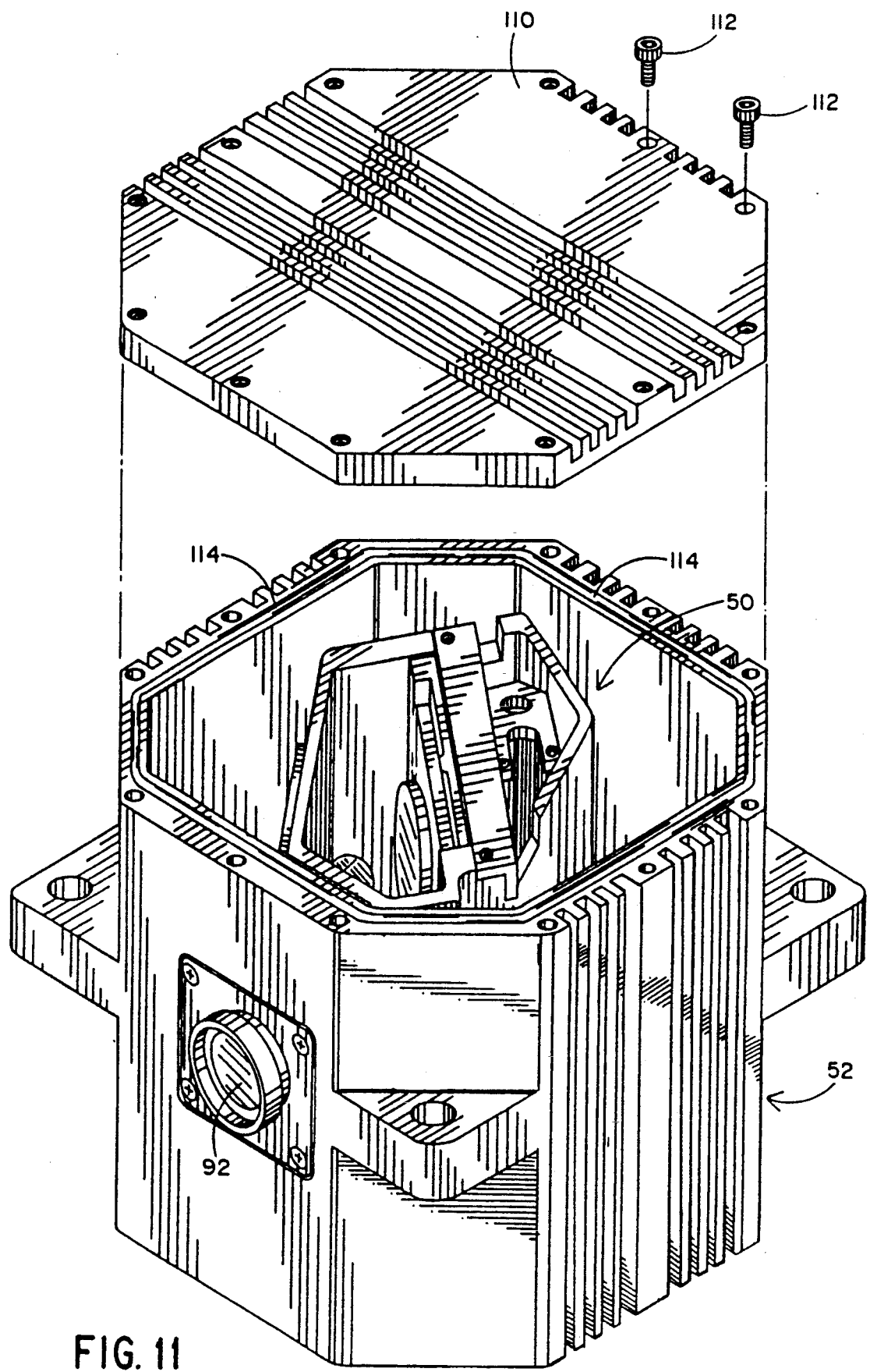
Figure 12:
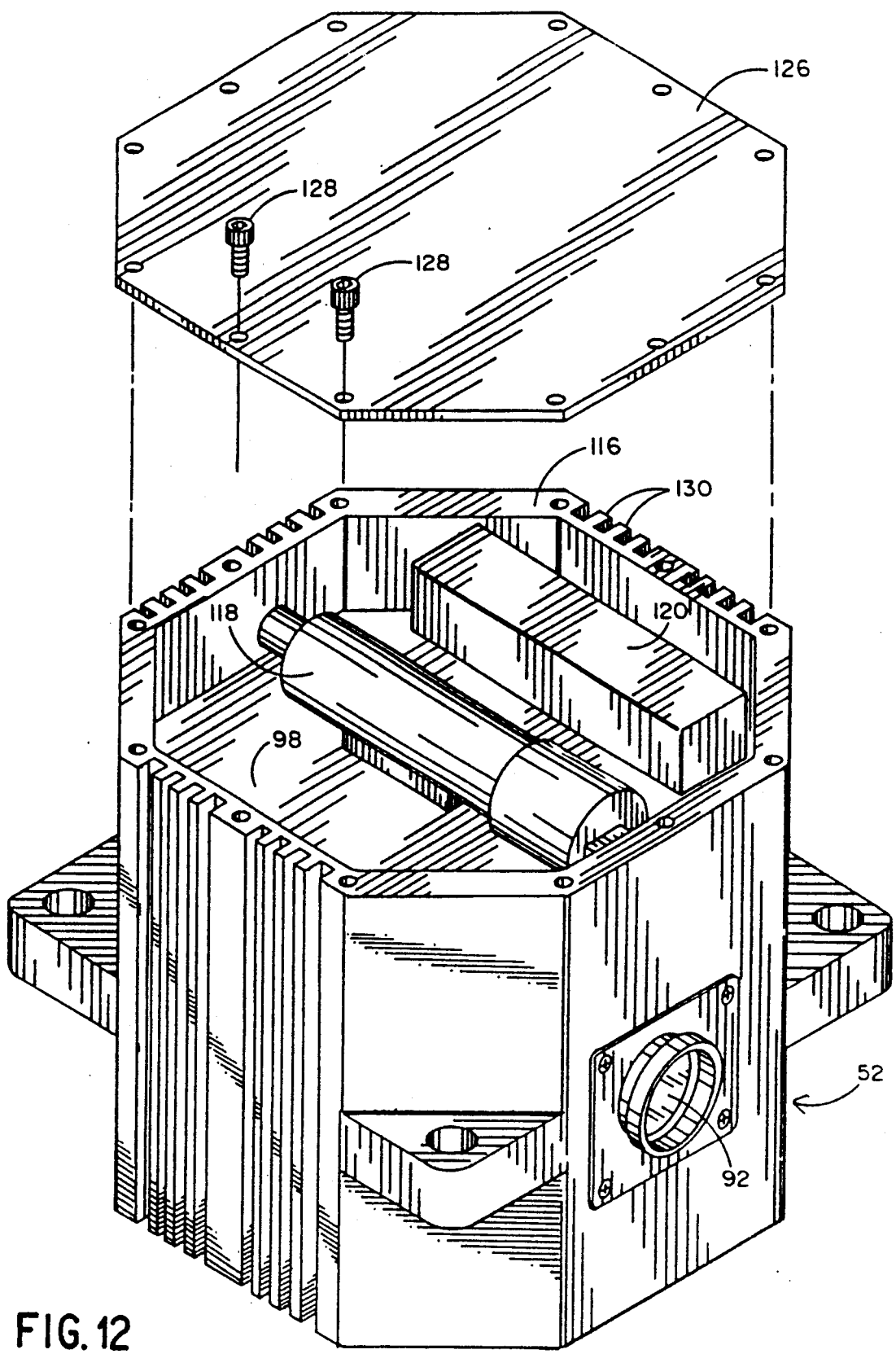

FIGS. 10–12 are isometric drawings showing the final assembly of the inner shell and outer shell combination. FIG. 10 shows the completed assembly in which a top plate 110 is secured to the outer shell by a plurality of fastening members 112. FIG. 11 shows the assembly as top plate 110 is being placed on the unit. A round cross-section sealing member 114 (O-ring) in a groove at the top of shell 52 provides hermetic sealing of the unit. This sealing protects the interferometer parts from the moisture and dust which are present in the external environment. This protection is particularly important for the linear roller bearings along which the moving wedge travels.

FIG. 12 shows the hermetically sealed unit from the bottom. The floor 98 (FIG. 6) of outer shell 52 is spaced far enough from the lower edge 116 of outer shell 52 to provide a chamber which houses two heat-generating components: a laser generator 118 and its power supply 120. The window 92 (FIG. 6) permits exit of the interferometer-modulated beam on its way to the sample and detector. A plate 126 is secured to the bottom edge 116 of outer shell 52 by fastening means 128, in order to enclose the chamber below floor 98.

Protection of the interferometer from excessive heat, and dissipating the heat from heat-generating components, are important aspects of the disclosed structure. Therefore, no heat sources are connected to inner shell 50. All heat sources are directly thermally sinked to outer shell 52, which, as shown in the drawings, has numerous external metal ribs 130 to increase the heat-dissipating surface.

As previously indicated, the laser and its power supply are outside the interferometer compartment, i.e., they are below floor 98 of outer shell 52. Another major heat source is the IR radiation source 68 (FIG. 6). It is not desirable to send the IR radiation through a window, because such a window would be both expansive and distorting, and would be subjected to degradation from the nearby hot IR source. The IR source is preferably an internally-reflecting sphere, of the type disclosed in common assignee U.S. Pat. No. 4,724,329. This IR source minimizes the thermal load of the source and provides an almost complete metal spherical envelope surrounding the source. The source-surrounding metal conducts heats directly to the outer casting 52, via floor 98. Other thermal sources are power transistors, which have been mounted on aluminum blocks bolted directly to the outer casting 52.

The interferometer, as previously stated, can be aligned prior to sealing the outer shell 52. The arrangement has been so conceived that this pre-alignment is both relatively simple to accomplish, and stable enough to be permanent. In other words, subsequent re-alignment is not necessary.

As previously stated, wedge-type interferometers have an inherent advantage, in that all three of the critical optical compartments—the beamsplitter wedge, and the two corner cube mirrors—do not move during interferometer operation. Only the non-beamsplitter wedge moves.

The invention makes it possible to use each of the three non-moving (fixed) optical components for initial alignment adjustment, after which each adjusted component is locked in place. The fixed wedge, in the invention, can be adjusted to provide the zero path difference (ZPD) alignment. This is possible because the laser clocking beam 100 (FIG. 6) travels in and out of the interferometer on under/over paths, instead of horizontally spaced paths. In other words, as stated above, the line 100 in the plan view of FIG. 6 represents both the incoming and returning paths of the laser beam, because they are vertically, rather than horizontally, spaced. The incoming laser beam is below the IR beam, and the returning laser beam is above the IR beam.

The two other initial, pre-sealing alignment adjustments (in addition to the ZPD adjustment) are the X-axis alignment and the Y-axis alignment. These alignments are made by adjusting the corner cube mirrors, prior to sealing the structure. As discussed above, micropositioner adjusting mechanisms are used for the alignments, and may be removed, before the inner shell 50 is permanently secured in the outer shell 52. In other words, permanent alignment may be provided by removable aligning mechanisms.

Figure 14:
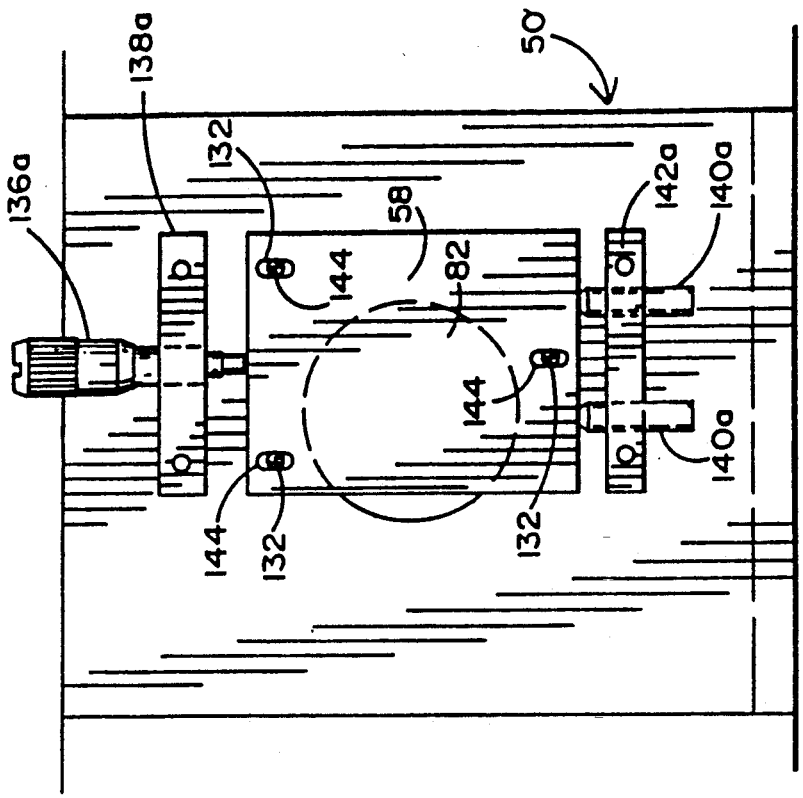
FIG. 14 is a side elevation showing the elements involved in the Y-axis alignment adjustment.
Figure 13:
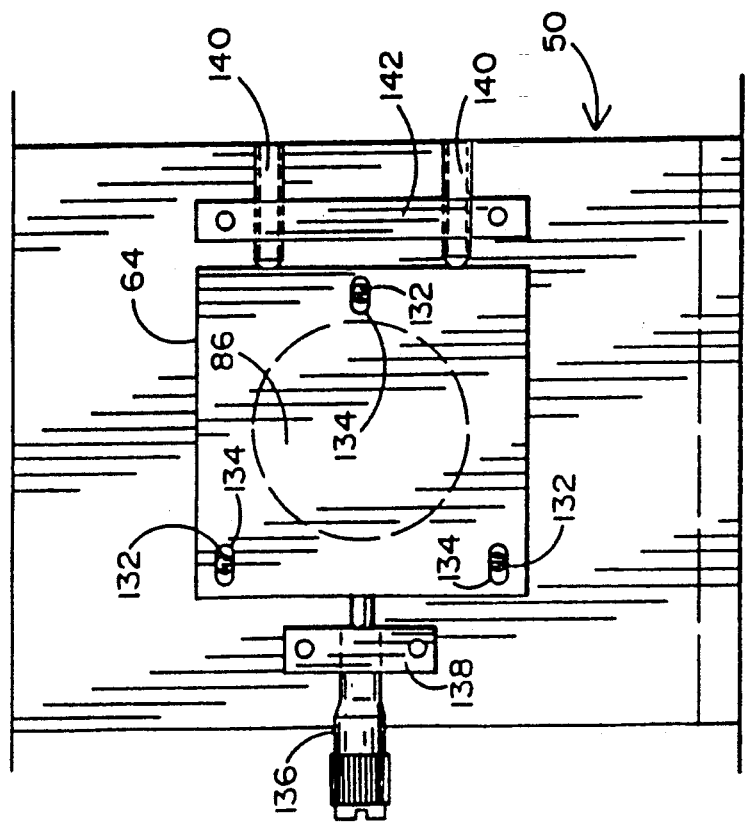
FIG. 13 is a side elevation showing the elements involved in the X-axis alignment adjustment.
Figure 15:
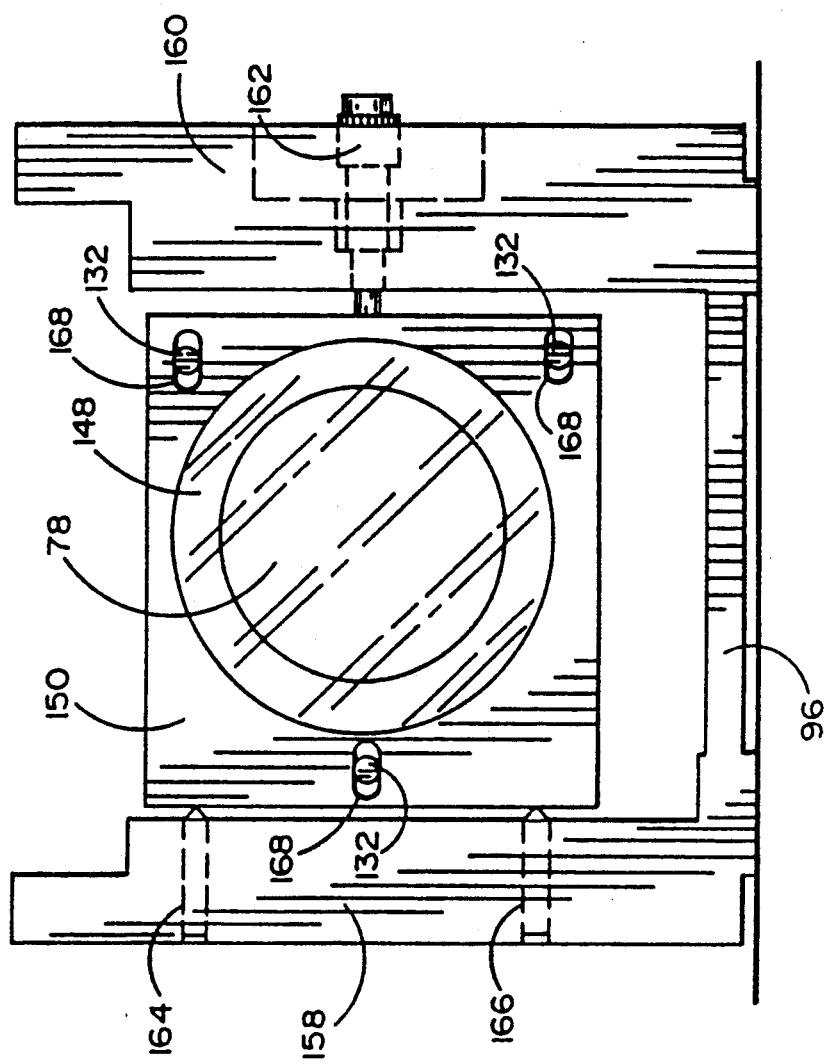
FIG. 15 is a side elevation showing the elements involved in the ZPD alignment adjustment.

FIGS. 13–15 show the alignment mechanisms for each of the three axis alignments. FIG. 13 shows the X-axis alignment mechanism. The alignment is accomplished by precise horizontal adjustment of plate 64 (FIGS. 5 and 6). Plate 64 carries the corner cube mirror 86, whose X-axis alignment is accomplished by horizontal adjustment of plate 64. Vertical motion of plate 64 is prevented by the three cylindrical bodies 132 of the fastening members 60, the heads of which are seen in FIG. 5. The bodies 132 of fastening members 60 engage the upper and lower sides of oblong slots 134 formed in plate 64, thus preventing vertical motion of plate 64.

Horizontal adjusting motion of plate 64 is controlled by a micrometer 136, which is threaded into a plate 138 secured to the outer wall of inner shell 50. Horizontal adjustment motion of plate 64 is resisted by two plungers 140, which are supported by a plate 142 secured to the outer wall of inner shell 50. In the aligning process, the laser clocking beam is first used to obtain rough alignment. Then the IR beam is used to obtain precise alignment. After such precise alignment, the fastening members 60, whose inner extensions have threaded engagement with openings in the wall of inner shell 50, are screwed tightly against plate 64, in order to permanently maintain the aligned position of plate 65 and corner cube 86. After alignment, the plates 138 and 142 are disengaged from shell 50, thus removing the adjusting mechanism from the structure.

FIG. 14 shows the Y-axis alignment mechanism. The alignment is accomplished by precise vertical adjustment of plate 58 (FIGS. 4 and 6). Plate 58 carries the corner cube mirror 82, whose Y-axis adjustment is accomplished by vertical adjustment of plate 58. Horizontal motion of plate 58 is prevented by the three cylindrical bodies 132 of the fastening members 60, the heads of which are seen in FIG. 4. The bodies 132 of fastening members 60 engage the left and right sides of oblong slots 144 formed in plate 58, thus preventing horizontal motion of plate 58.

Vertical adjustment motion of plate 58 is controlled by a micrometer 136a, which is threaded into a plate 138a secured to the outer wall of inner shell 50. Vertical adjustment motion of plate 58 is resisted by two plungers 140a, which are supported by a plate 142a secured to the outer wall of inner shell 50. The vertical adjustment process is performed in the same manner as the horizontal adjustment process. After precise alignment, the fastening members 60 are screwed tightly against plate 58, in order to permanently maintain the aligned position of plate 58 and corner cube 82. Then the adjustment mechanism is removed from the structure.

One corner cube could be used to provide both horizontal and vertical alignment adjustments. However, that would require having more complex adjustment procedures; and the attained alignment would be less reliable as a permanent alignment.

FIG. 15 shows the ZPD adjustment mechanism. The ZPD adjustment is accomplished by precise adjustment of the fixed wedge in the Z-axis, i.e., in a direction transverse to the optical path of the IR radiation. The laser radiation path is not useful in the ZPD adjustment, only the IR radiation path.

The fixed wedge-shaped prism 78, the inner surface of which has the beamsplitter coating 76, is supported in an annular member 148, which in turn is carried by a plate 150. As seen best in FIG. 5, the plate 150 is held against a wall 152, which is a rigid metal member formed as part of the inner shell 50 casting, and extending between opposite walls 154 and 156 thereof. The wall 152 includes vertical flanges 158 and 160 (FIG. 15), between which plate 150 is located.

In the ZPD alignment adjustment, a micrometer 162 is in engagement with the right side of plate 150, and pins 164 and 166 are in engagement with the left side of plate 150. As in the X-axis and Y-axis adjustments, the plate 150 is constrained to move only in the Z (horizontal) direction by the bodies 132 of fastening members 60, which engage the upper and lower sides of oblong slots 168 formed in plate 150. After alignment adjustment of the fixed wedge 78, plate 150 is securely held in place against wall 152, by screwing the fastening members 60 tightly against plate 150.

Throughout the disclosed structure, engagement between two essentially flat members is preferably accomplished by three position contact. This has the advantages of reducing flatness tolerance requirements, and of minimizing thermal transfer and stress. Three point mounting is used: (a) between the floor 96 of inner shell 50 and the floor 98 of outer shell 52 (FIG. 6); (b) between plate 58 and wall 56 of inner shell 50 (FIG. 4); between plate 64 and wall 62 of inner shell 50 (FIG. 5); and between plate 150 and wall 152 (FIG. 15).

Figure 16:
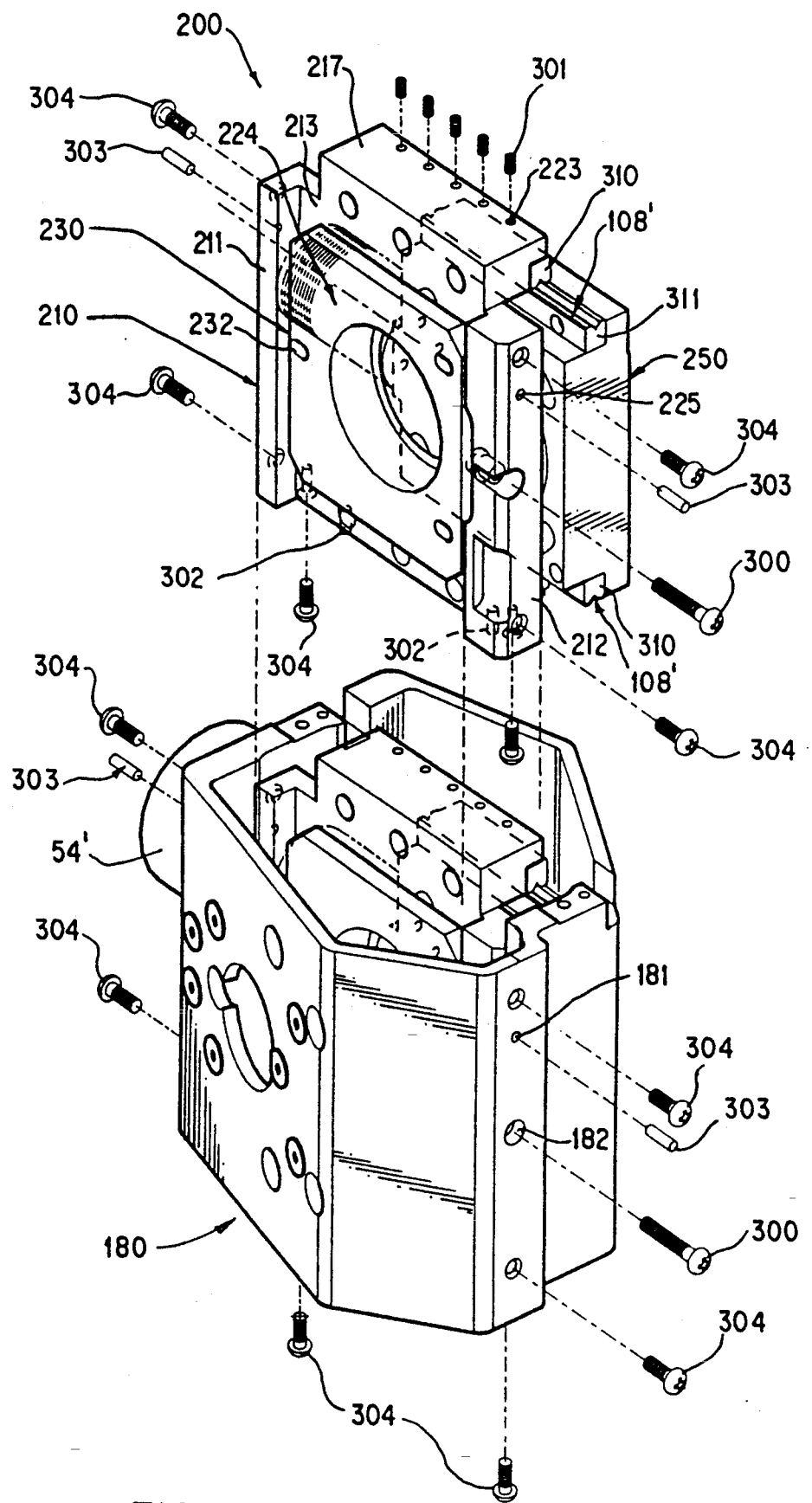
FIG. 16 is an exploded, isometric, view of a removable, optical cartridge and inner shell constructed according to the principles of the invention.
Figure 21:
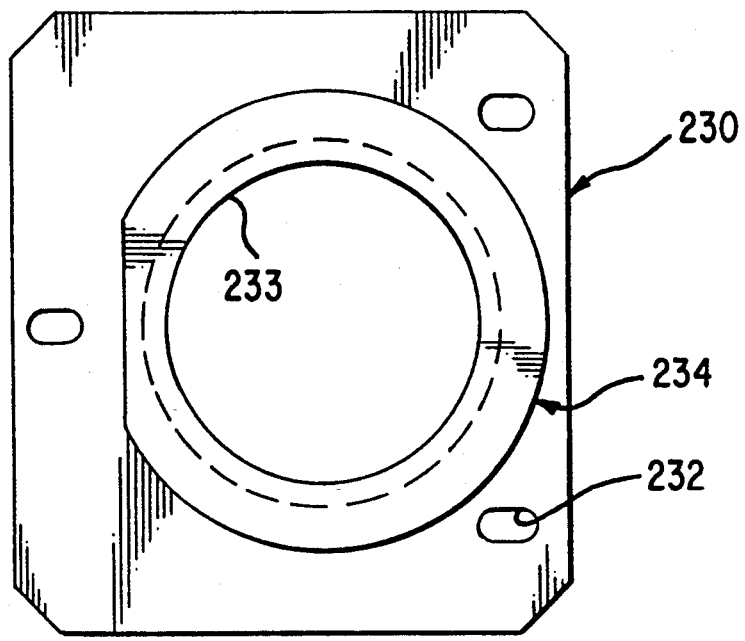
FIGS. 20-21, respectively, are elevational views of the outer side and inner side (not visible in FIG. 16) of a fixed wedge carrier that can be attached to the removable optical cartridge of the invention.
Figure 22:
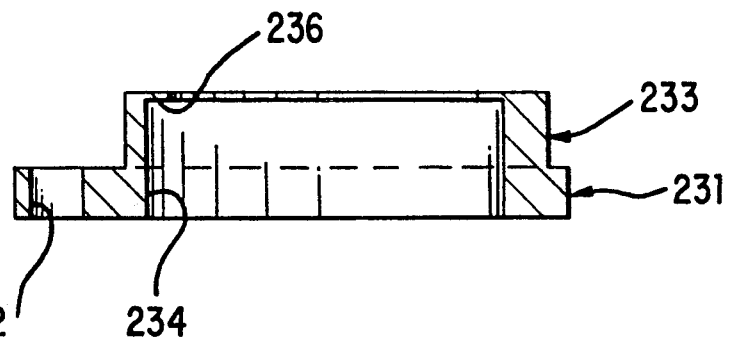
FIG. 22 is a sectional view of the fixed wedge carrier shown in FIGS. 20-21.
Figure 20:
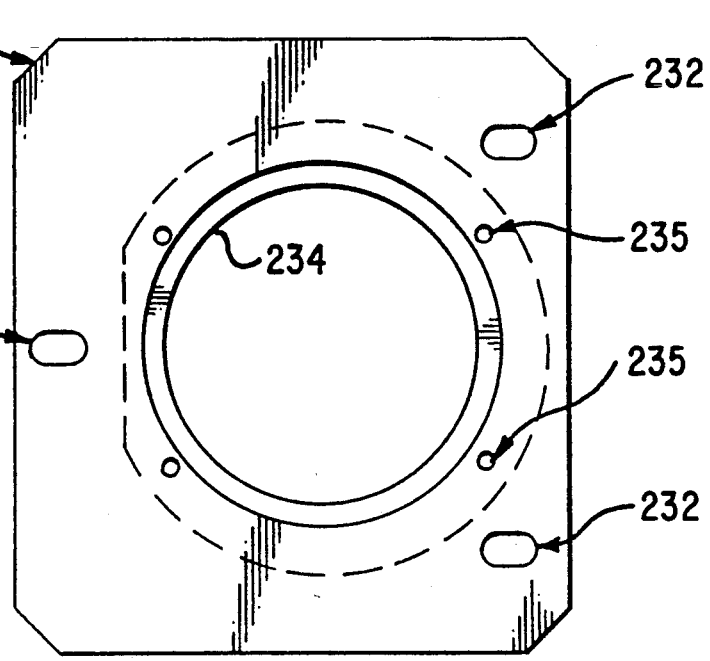

FIG. 16 discloses a modification in which the inner shell is essentially formed as two pieces—a generally hollow shell and a unitary, readily replaceable, optical unit 200 advantageously designed as a drop-in cartridge. In the inner shell design of FIGS. 4–5, the most sensitive optical elements—the fixed and moving wedges—have to be installed in shell 50 before the bearings 108 (FIG. 9) are aligned and pre-loaded, which is essentially the last step in assembling shell 50. As evident from FIG. 5, mechanical alignment of the bearings, which is crucial to ensure that the wedge faces are parallel throughout the entire stroke of the moving wedge, is an arduous task due to the confined space inside the shell. A special alignment jig is required to accommodate the optical elements, which are exposed to handling and the atmosphere. Furthermore, the confined space prevents use of conventional tools or holders to make any further optical adjustments. (The wedges having been optically adjusted prior to assembly in shell 50 by appropriate rotation of annular member 102 relative to plate 104 for the moving wedge (FIGS. 8–9) and rotation of annular member 148 relative to plate 150 for the fixed wedge (FIG. 15)). Hence, after installation inside shell 50, independent alignment of the wedge faces is not possible without risking damage to these sensitive elements. Moreover, if testing of the assembled shell unit 50 reveals problems, disassembly of the optics, and subsequent re-installation to the shell is required.

The optical cartridge of the invention avoids the above-noted drawbacks. The exploded view of FIG. 16 illustrates the basic construction of inner shell casting 180. Shell 180 is essentially similar to shell 50 discussed above, and only the significant differences are discussed below. Parts shown in FIG. 16 that are similar to previously discussed parts have been designated with like reference numerals. Inner shell 180 does not include an inner wall as illustrated in FIG. 5 at 152. Instead, the shell 50 is essentially hollow and has a central opening at the top, which is adapted to slidingly receive removable, optical cartridge 200. The cartridge comprises a cast centerpiece 210 supporting a fixed wedge-shaped prism shaped prism carrier 230 at one side and a movable wedge-shaped prism carrier 250 at the other side via upper and lower linear bearing assemblies 108', 108'. As indicated by the prime designations, the bearing assemblies may be of the same construction as those disclosed above.

For the purpose of clarity, the fixed and movable wedges themselves have been omitted from FIGS. 16–25. Each of the fixed and movable wedge carriers includes means for effecting rotational adjustment of and then securing the wedge relative to its carrier. For instance, with respect to the fixed wedge carrier shown in FIGS. 20–22, the carrier 230 is integrally formed with a rectangular plate portion 231 and an annular portion 233 extending perpendicularly from the inner side of the plate portion. A stepped bore 234 having a thin shoulder 236 is formed in plate 231 and annular portion 233 for receiving and retaining the fixed wedge, which is non-rotatably mounted in an annular support member (not shown). The support member has a flange similar to the flange 104a shown in FIG. 9, but to effect rotational adjustment of the fixed wedge relative to the carrier 230, the flange of this support member has four elongated, arcuate slots (similar to the slots 232 in carrier 230) that can be aligned with threaded bores 235 formed in carrier 230 after the annular support member is received in bore 23. Thus, the rotational position of the fixed wedge relative to the carrier 230 can be adjusted via the arcuate slots and then secured by screws or other fasteners threadably received in bores 235.

Similarly, the rotational position of the movable wedge can be adjustably secured. FIGS. 23-25 illustrate the movable wedge carrier 250 which is formed from a generally rectangular member 251. A stepped bore 253 having a thin shoulder 254 is formed in the member 251 for receiving the movable wedge, which is not shown. Four elongated, arcuate slots 252 are formed in the rectangular member 251 for retaining the movable wedge via two bars 260 each of which extends across and is connected to two of the slots 252 by suitable fasteners received in threaded bores 261. Bars 260, only one of which is shown, clamp the wedge in position when suitably secured and permit relative rotation of the wedge when loosened.

As shown in FIG. 16, the fixed wedge carrier 230 is retained between opposed longitudinal flanges 211, 212 of the centerpiece, which extend perpendicularly from its generally flat, web portion 213. As shown best in FIG. 17, centerpiece 210 has a central cut-out 214 to permit the analytical and laser referencing beams to pass through the wedges supported by the centerpiece. The fixed wedge carrier 230 is fixedly, but adjustably mounted to web portion 213 by three fastening members (not shown), which extend (without vertical play but with horizontal play) through elongated slots 232 and into threaded bores 215. Instead of a micrometer, the fixed wedge carrier is adjustably positioned by rotating an screw 300, which is threadably received in bore 216 of flange 212 for abutting one end of the carrier 230 to adjust its horizontal position during the ZPD alignment.

Formed integrally with the top and bottom of web portion 213 are transversely extended flanges 217, 218. As shown in FIG. 18, each horizontal flange contains a perpendicular shoulder 219, 220 for receiving a bearing race of one of the bearing assemblies 108'. As shown in FIG. 16, each bearing assembly 108' includes an upper bearing race 310, a lower bearing race 311, and a bearing rack or cage containing linear roller bearing elements disposed therebetween. The upper bearing race 310 of the upper bearing assembly is secured to shoulder 219 of the centerpiece via suitable fasteners (not shown) extending through threaded bores 221 formed in upper flange 217. The lower bearing race of the lower bearing assembly (not shown) is similarly secured to shoulder 220 of the centerpiece by suitable fasteners (not shown) extending through threaded bores 222 formed in lower horizontal flange 218. The lower race 311 of the upper bearing assembly and the upper race 310 of the lower bearing assembly 108' are connected in a similar fashion to shoulders 256 formed in upper and lower portions of the moving wedge carrier 250 behind flanges 255. (FIGS. 23-25). These races are connected by fasteners extending through threaded bores 257 formed in the flanges 255. In this manner, the moving wedge carrier 250 is supported in a center-of-mass linear bearing system solely by the centerpiece 210. A series of bearing adjustment screws 301 are provided to pre-load the bearings via threaded bores 223 in upper flange 217 to ensure the bearings remain parallel in the horizontal and vertical planes throughout the stroke.

The carrier 250 is connected to the actuating shaft of motor 54' via fasteners (not shown) disposed in bores 259 formed in extension 258 (FIG. 24). The centerpiece is formed with a curved cut-out portion 224, as shown best in FIG. 16, to accommodate the actuating shaft.

After the cartridge 200 has been assembled, and mechanically and optically aligned in the manner discussed in detail below, it is ready to be connected to the inner shell 180. Flanges 211, 212 are slidable received by opposed walls of the shell 180 as the cartridge 200 is inserted into the open top of the shell. A pair of alignment pins 302 are permanently installed in bores in the bottom of centerpiece 210 and are received by a pair of mating recesses formed in the base of the inner shell casing 100 to precisely locate the bottom of the cartridge in the shell 100. Of course, the pins alternatively could be provided on the base of the shell and the mating recesses provided on the cartridge. Each side of the cartridge 200 is precisely located by the insertion of a temporary alignment pin 303 through a hole 181 in the shell 180 and into a bore 225 formed in flanges 211, 212 of the centerpiece. The cartridge then is secured by tightening fasteners 304 into threaded bores 226 formed in the bottom and sides of the centerpiece, after which the side pins 303 are removed. If required, the cartridge 21 may be removed from the shell as a unit by simply removing the fasteners 304.

The advantages of the cartridge can best be understood with reference to following preferred assembly procedures. To assemble the cartridge, the following components are required and the procedure should be carried out in a clean room:
Assembled compensator carrier (moving wedge)
Assembled beamsplitter carrier (fixed wedge)
Prealigned inner shell casting
Calibration jig

COARSE OPTICAL ALIGNMENT

The first step is to calibrate the wedges, which is a coarse optical alignment in which the wedges are rotated in their respective carriers before attachment to the centerpiece. As is well known in the art, the wedges are rotated to establish parallelism of the wedge faces.

BEARING ASSEMBLY

The next step is to assemble and pre-load the bearing assemblies by connecting the compensator carrier to the centerpiece. Because of the previously discussed requirement of parallelism of the wedge faces, it is important that the bearings are assembled and adjusted to ensure that the bearing faces are parallel with each other in both the horizontal and vertical planes, i.e., that they do not vertically widen at one end because of varying clearance, nor skew out of plane horizontally. All of the bearing assembly steps below are performed with this requirement in mind.
1. Connect the lower bearing race to the lower horizontal flange of the centerpiece using a precision block and vise after verifying parallelism between the race and flange.
2. Mount the centerpiece on the jig and install the lower bearing rack in the center of the lower bearing race.
3. In stall the compensator carrier, which already has the lower bearing race of the upper bearing assembly and the upper bearing race of the lower bearing assembly installed, on top of the lower bearing set so the races are directly above each other. A support clip may be used to stabilize the mount until the bearing set has been assembled.
4. Install the upper bearing rack in the center of the lower race of the upper bearing assembly.
5. Install the upper bearing race of the upper bearing assembly on top of the compensator carrier centered on the lower race. Fasten the upper race to the upper horizontal flange of the centerpiece by hand-tightening the fasteners to allow setting of the bearing pre-load.

6. Move the compensator carrier to one end of travel and adjust the three pre-load set screws that are at the same end of the centerpiece.
7. Move the compensator carrier to the opposite end of travel and adjust the pre-load set screws that are on this side of the centerpiece.
8. Recheck the pre-load settings for both ends of travel and adjust until no friction or play is evident visibly or by feel. Torque down the fasteners for the upper race after the pre-load adjustment is complete.
9. Check the compensator housing for excessive deflection throughout the full stroke with a wire type deflection indicator. If excess deflection is evident, reassemble the bearing set and clean if required under a fume hood with the filter in operation.

FINE OPTICAL ALIGNMENT

The next steps involve fine tuning the optical alignment of the wedges using a laser beam to ensure parallelism of the wedge faces. These steps essentially can not be performed with the FIG. 5 shell design because the bearing installation and pre-load is the last step in the inner shell assembly process, with the optics already being installed inside the shell. Independent alignment is not possible without risking serious damage to the sensitive optical wedges through tedious procedures because there is no room for conventional holder or tools inside the shell. Fine tuning of the optical alignment is accomplished in the cartridge design by these steps:

1. Verify that the height of the laser beam exiting the compensator wedge is correct using a pinhole mount. Check the height of the beam reflecting from the front surface of the compensator wedge. Rotate the wedge, if necessary, by loosening the clamp screws provided on the carrier for adjustably securing the angular position of the wedge. When the laser beam is at the same height as the first beam, tighten the screws to fix the rotational position of the wedge.
2. Install the beamsplitter carrier onto the centerpiece using appropriate fasteners. Verify that the height of the laser beam is correct for both the front surface and the passing beams. If necessary, rotate the wedge in its mount to allow the beams to pass the pinhole, by loosening the clamp screws.
3. Place a calibration label on top of the centerpiece frame with the serial number of the wedges installed, thereby indicating that the cartridge is pre-qualified, i.e., it is optically and mechanically aligned, and the bearing pre-load is set properly. (Hence, the cartridge increases reliability with respect to both the mechanical and optical performance of the interferometer because prior to insertion into the inner shell, the required adjustments have been performed and it is known whether the optics and mechanics are qualified and should be inserted into the shell.)

As an option, at this point temperature testing over the contemplated operating range can be preformed to further insure reliability. If a problem is uncovered, the defective part can be adjusted or replaced easily because the cartridge has not yet been installed in the inner shell. However, even if temperature testing is not performed until after the cartridge has been assembled to inner shell and the inner shell mounted inside the sealed outer shell, the cartridge design still is extremely advantageous. If the sealed interferometer unit fails the temperature testing, the outer shell can be opened and a new, pre-qualified cartridge can easily be substituted. Due to the readily replaceable design of the cartridge, this step could be performed in the field by a relatively skilled technician instead of the usual practice of shipping the unit back to the factory for replacement by a highly skilled technician.

INNER SHELL ASSEMBLY

The next step after the cartridge has been pre-qualified is assembly to the inner shell. This process is carried out on the inner shell that is to be used with the pre-qualified cartridge. The required components are:

Inner shell with quadrature preamp for laser referencing system and prealigned laser mirror assembly
Corner cube assemblies calibrated for the optical range of the wedge pair.

The assembly steps are as follows:
1. The cartridge is inserted into the open end of inner shell and the bottom and sides of the cartridge are precisely located using the alignment procedures discussed above, and then fastened to the inner shell.
2. After the cartridge has been fastened in the shell, a final optical verification of the accuracy of the rotational adjustment of the wedge pair is done before installing the corner cubes. The jig alignment procedure discussed above is repeated after removing the cartridge, if corrections are required.
3. Once the final optical alignment has been verified with the cartridge in place, the corner cube mirrors are installed onto the shell and aligned with micropositioner adjusting mechanisms, such as those disclosed in FIGS. 13-14, and the ZPD adjustment is performed. As discussed above, the ZPD adjustment mechanism of FIG. 15 is not used. The Z-axis (horizontal) position of the fixed wedge is adjusted by the beamsplitter adjusting screw 300, which as shown in FIG. 16 extends through bores in the inner shell and the centerpiece to position the fixed wedge carrier. Instead of a removable micrometer and adjusting bars, the support plates of the corner cubes may include adjusting screw mechanisms (similar to ZPD adjustment mechanism shown in FIG. 16.) for aligning the corner cubes.

FINAL ASSEMBLY STEPS

After the X, Y, and Z axis adjustments have been made by adjusting the corner cube mirrors and beamsplitter, any remaining components may be attached to the inner shell and the unit mounted and sealed within an outer shell, as described in connection with FIGS. 10-12.

What is claimed is:
1. An interferometer structure, for an interferometer of the type having two optical arms, comprising:
   a supporting shell having lower and side surfaces adapted to support optical elements of the interferometer;
   a fixed wedge-shaped prism mounted inside the shell, which is supported throughout its vertical dimension by the shell, and which has a beamsplitter coating on its inner side;
   a movable wedge-shaped prism mounted inside the shell adjacent to the fixed prism, which is supported throughout its vertical dimension by the shell, and which is adapted to move transversely back and forth across one optical arm of the interferometer;

a first retroreflecting mirror, which is fixedly supported on an inner wall of the supporting shell, and which constitutes the end of one optical arm of the interferometer;

a second retroreflecting mirror, which is fixedly supported on an inner wall of the supporting shell, and which constitutes the end of the other optical arm of the interferometer;

an outer shell inside which the supporting shell is secured; and means for hermetically sealing the outer shell.

2. The interferometer of claim 1 in which the supporting shell is a metal casting.

3. The interferometer of claim 1 in which both the interferometer supporting shell and the outer shell are metal castings.

4. The interferometer of claim 1 in which the outer shell provides a heat sink for heat-generating components.

5. The interferometer of claim 3 in which the outer shell provides a heat sink for heat-generating components.

6. The interferometer of claim 1 wherein said supporting shell includes an inner wall supporting at least one of the fixed and movable wedge-shaped prisms.

7. The interferometer of claim 1 wherein said supporting shell includes a removable optical cartridge detachably secured in a fixed position within the supporting shell, said cartridge including a centerpiece fixedly supporting said fixed wedge-shaped prism and movably supporting said movable wedge-shaped prism for linear movement transversely back and forth across said one optical arm of the interferometer.

8. An interferometer structure, for an interferometer of the type having two optical arms, comprising:

a supporting shell having lower and side surfaces adapted to support optical elements of the interferometer;

a fixed wedge-shaped prism mounted inside the shell, which is supported throughout its vertical dimension by the shell, and which has a beamsplitter coating on its inner-side;

a movable wedge-shaped prism mounted inside the shell adjacent to the fixed prism, which is supported throughout its vertical dimension by the shell, and which is adapted to move transversely back and forth across one optical arm of the interferometer;

a first retroreflecting mirror, which is fixedly supported on an inner wall of the supporting shell, and which constitutes the end of one optical arm of the interferometer;

a second retroreflecting mirror, which is fixedly supported on an inner wall of the supporting shell, and which constitutes the end of the other optical arm of the interferometer;

a first track, along which the movable wedge-shaped prism travels, which is located below the prism; and a second track, along which the movable wedge-shaped prism travels, which is located above the prism.

9. The interferometer of claim 8 further comprising:
a motor for driving the movable wedge-shaped prism by exerting force thereon substantially midway between the first and second tracks.

10. The interferometer of claim 8 in which linear roller bearings are mounted between the movable wedge-shaped prism and each of the first and second tracks.

11. The interferometer of claim 8 wherein the first track is secured to the lower surface of said supporting shell and the second track is secured to an upper surface of said supporting shell.

12. The interferometer of claim 8 wherein said supporting shell includes a removable optical cartridge detachably secured in a fixed position within the supporting shell, said cartridge including a centerpiece fixedly supporting said fixed wedge-shaped prism and movably supporting said movable wedge-shaped prism for linear movement by said first and second tracks.

13. The interferometer of claim 12 wherein said movable-wedge shaped prism is mounted in a carrier, said first track comprises a first bearing assembly connected between the centerpiece and the carrier, and said second track comprises a second bearing assembly connected between the centerpiece and the carrier.

14. An interferometer structure, for an interferometer of the type having two optical arms, comprising:

a supporting shell having lower and side surfaces adapted to support optical elements of the interferometer;

a fixed wedge-shaped prism mounted inside the shell, which is supported throughout its vertical dimension by the shell, and which has a beamsplitter coating on its inner-side;

a movable wedge-shaped prism mounted inside the shell adjacent to the fixed prism, which is supported throughout its vertical dimension by the shell, and which is adapted to move transversely back and forth across one optical arm of the interferometer;

a first retroreflecting mirror, which is fixedly supported on an inner wall of the supporting shell, and which constitutes the end of one optical arm of the interferometer;

a second retroreflecting mirror, which is fixedly supported on an inner wall of the supporting shell, and which constitutes the end of the other optical arm of the interferometer;

a first supporting plate that carries the first retroreflecting mirror and is tightly secured to a wall of the supporting shell; and means for adjusting one of the horizontal and vertical positions of the first supporting plate with respect to the wall of the supporting shell before the first plate is tightly secured to the wall.

15. The interferometer of claim 14 further comprising:

a second supporting plate that carries the second retroreflecting mirror and is tightly secured to a wall of the supporting shell; and means for adjusting the other of the horizontal and vertical positions of the second supporting plate with respect to the wall of the supporting shell before the second plate is tightly secured to the wall.

16. The interferometer of claim 15 wherein the adjusting means of the first supporting plate adjusts the horizontal position of the first plate and the adjusting means of the second supporting plate adjusts the vertical position of the second plate.

17. The interferometer of claim 15 in which the adjusting means for the two retroreflector supporting plates are removable from the supporting shell after the adjustments have been performed.

18. The interferometer of claim 15 wherein the adjusting means for the two retroreflector supporting plates comprise mechanisms remaining with the supporting shell after the adjustments have been performed.

19. An interferometer structure, for an interferometer of the type having two optical arms, comprising:
- a generally hollow supporting shell having an open top, and lower and side surfaces for supporting optical elements of the interferometer;
- a cartridge detachably secured in a fixed position within the supporting shell, said cartridge including:
  - (i) a fixed wedge-shaped prism supported throughout its vertical dimension by the cartridge, said fixed prism having a beamsplitter coating on its inner side; and
  - (ii) a movable wedge-shaped prism mounted adjacent to the fixed prism for linear movement transversely across one optical arm of the interferometer;
- a first retroreflecting mirror fixedly supported on an inner wall of the supporting shell, said first mirror constituting the end of one optical arm of the interferometer; and
- a second retroreflecting mirror fixedly supported on an inner wall of the supporting shell, said second mirror constituting the end of the other optical arm of the interferometer.

20. The interferometer of claim 19 further comprising an outer shell inside which the supporting shell is secured and means for hermetically sealing the outer shell.

21. The interferometer of claim 20 in which both the supporting shell and the outer shell are metal castings, and said outer shell provides a heat sink for heat-generating components.

22. The interferometer of claim 19 wherein said cartridge includes a centerpiece having one side supporting a first carrier in which the fixed prism is mounted and another side supporting a second carrier in which the movable prism is mounted, said second carrier being supported for linear movement by a first bearing assembly connected between the centerpiece and the second carrier at a first position above the movable prism and by a second bearing assembly connected between the centerpiece and the second carrier at a second position below the movable prism.

23. The interferometer of claim 22 wherein said first and second positions comprise transverse flanges extending generally perpendicularly from the other side of the centerpiece, and said bearing assemblies each comprise an upper race, lower race, and linear roller bearing elements disposed therebetween, with the upper race of the first bearing assembly being connected to the transverse flange disposed above the movable prism, the lower race of the second bearing assembly being connected to the transverse flange disposed below the movable prism, and the lower race of the first bearing assembly and upper race of the second bearing assembly being connected to said second carrier.

24. The interferometer of claim 23 wherein the upper transverse flange includes a plurality of spaced, threaded bores extending through the upper flange in the longitudinal direction, each of said bores receiving an adjusting screw for abutting the upper race of the first bearing assembly to set the pre-load of the bearing assemblies to ensure parallelism of the wedges throughout linear movement of the second prism.

25. The interferometer of claim 22 further comprising a motor for driving the movable wedge-shaped prism by exerting force on the second carrier at a point disposed substantially midway between the first and second bearing assemblies.

26. The interferometer of claim 22 wherein the first carrier includes a plurality of elongated slots extending generally transverse to the longitudinal flanges, said one side of the centerpiece includes a plurality of bores that can be aligned with said slots, and fasteners are provided to extend through said slots, with play in the transverse direction, and into said bores, to fixedly attach the first carrier to the centerpiece.

27. The interferometer of claim 26 wherein said centerpiece is defined by two longitudinally extending flanges and a web portion extending therebetween, said web portion including the central aperture, and wherein one of said longitudinally extending flanges includes a threaded bore receiving a screw having an end abutting the first carrier for adjusting the transverse position of the first carrier via said slots.

28. The interferometer of claim 19 further comprising means for locating the cartridge assembly in a predetermined position within the supporting shell.

29. The interferometer of claim 19 further comprising:
- a first supporting plate that carries the first retroreflecting mirror and is tightly secured to a wall of the supporting shell; and
- means for adjusting one of horizontal and vertical positions of the first supporting plate with respect to the wall of the supporting shell before the plate is tightly secured to the wall.

30. The interferometer of claim 29 further comprising:
- a second supporting plate that carries the second retroreflecting mirror and is tightly secured to a wall of the supporting shell; and
- means for adjusting the other of the horizontal and vertical positions of the second supporting plate with respect to the wall of the supporting shell before the plate is tightly secured to the wall.

31. The interferometer of claim 30 in which the adjusting means for the two retroreflector supporting plates remain with the supporting shell after the adjustments have been performed.

32. A cartridge assembly for supporting optical elements of an interferometer comprising:
- a centerpiece including a central aperture extending therethrough;
- a first wedge-shaped prism mounted in a first carrier fixedly attached to one side of the centerpiece in a position overlying the central aperture; and
- a second wedge-shaped prism mounted in a second carrier supported, from two longitudinally spaced positions on the other side of said centerpiece, for linear movement transversely across the central aperture.

33. The cartridge assembly of claim 32 wherein said second carrier is supported for linear movement by a first bearing assembly connected between the centerpiece and the second carrier at one of said longitudinally spaced positions and by a second bearing assembly connected between the centerpiece and the second carrier at the other of said longitudinally spaced positions.

34. The cartridge assembly of claim 33 wherein said longitudinally spaced positions of the centerpiece comprise transverse flanges extending generally perpendicularly from the other side of the centerpiece and said bearing assemblies each comprise an upper race, lower race, and linear roller bearing elements disposed therebetween, with the upper race of the first bearing assembly being connected to one of transverse flanges, the lower race of the second bearing assembly being connected to other transverse flange, and the lower race of the first bearing assembly and upper race of the second bearing assembly being connected to said second carrier.

35. The cartridge assembly of claim 34 when said one transverse flange includes a plurality of spaced, threaded bores extending through the flange in the longitudinal direction, each of said bores receiving an adjusting screw for abutting the upper race of the first bearing assembly to set the pre-load of the bearing assemblies to ensure parallelism throughout linear movement of the second prism.

36. The cartridge assembly of claim 32 wherein the centerpiece and the first and second carriers are each formed as metal castings.

37. The cartridge assembly of claim 32 wherein the first carrier includes a plurality of elongated slots extending generally transverse to the longitudinal flanges, said one side of the centerpiece includes a plurality of bores that can be aligned with said slots, and fasteners are provided to extend through said slots, with play in the transverse direction, and into said bores, to fixedly attach the first carrier to the centerpiece.

38. The cartridge assembly of claim 37 wherein said centerpiece is defined by two longitudinally extending flanges and a web portion extending therebetween, said web portion including the central aperture, and wherein one of said longitudinally extending flanges includes a threaded bore receiving a screw having an end abutting the first carrier for adjusting the transverse position of the first carrier via said slots.

39. The cartridge assembly of claim 32 wherein the centerpiece includes means for locating the cartridge assembly in a predetermined position within an interferometer supporting structure.

40. A method of constructing an interferometer structure, comprising:
   forming an optical cartridge from a first wedge-shaped prism fixedly attached to the cartridge such that its vertical dimension is supported by the cartridge and from a second wedge-shaped prism disposed adjacent the first wedge-shaped prism and supported by the cartridge for linear movement in a transverse direction;
   mechanically and optically aligning the first and second wedge-shaped prisms;
   forming a unitary, generally hollow inner shell having an open top, and lower and side supporting surfaces;
   inserting the optical cartridge into the open top of the inner shell and detachably securing the cartridge in a predetermined position inside the inner shell;
   securing two corner cube mirrors to side supporting surfaces of the inner shell;
   forming a unitary outer shell large enough to contain the inner shell;
   placing the inner shell inside the outer shell and securing them together;
   and covering the outer shell to maintain the inner shell in a hermetically sealed environment.

41. The method of claim 40 further comprising the steps of:
   checking the optical alignment of the prisms after the optical cartridge has been secured inside the inner shell; and
   removing the cartridge from the inner shell and optically realigning the prisms, if necessary.

42. The method of claim 41 furthering comprising the step of:
   adjusting the positions of the two corner cube mirrors, before securing their positions, to provide X-axis alignment and Y-axis alignment of the interferometer, using precise adjusting mechanisms.

* * * * *